(12) United States Patent
Hori et al.

(10) Patent No.: US 8,477,429 B2
(45) Date of Patent: Jul. 2, 2013

(54) ZOOM LENS SYSTEM AND IMAGE PICKUP APPARATUS INCLUDING THE SAME

(75) Inventors: Masao Hori, Utsunomiya (JP); Youtarou Sanjou, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 400 days.

(21) Appl. No.: 12/688,012

(22) Filed: Jan. 15, 2010

(65) Prior Publication Data
US 2010/0182705 A1 Jul. 22, 2010

(30) Foreign Application Priority Data
Jan. 19, 2009 (JP) ................. 2009-008715

(51) Int. Cl.
*G02B 15/14* (2006.01)
(52) U.S. Cl.
USPC .................................... 359/688; 359/686
(58) Field of Classification Search
USPC ................................ 359/688, 686
See application file for complete search history.

(56) References Cited

U.S. PATENT DOCUMENTS

| | | | | |
|---|---|---|---|---|
| 6,028,715 | A * | 2/2000 | Takamoto et al. | ............ 359/688 |
| 6,825,990 | B2 | 11/2004 | Yoshimi et al. | |
| 7,193,789 | B2 | 3/2007 | Maetaki | |
| 7,304,805 | B2 * | 12/2007 | Endo et al. | ............ 359/690 |
| 7,864,445 | B2 * | 1/2011 | Shirasuna | ............ 359/687 |
| 7,916,399 | B2 * | 3/2011 | Miyano | ............ 359/688 |

FOREIGN PATENT DOCUMENTS
JP 2005-084409 A 3/2005

* cited by examiner

*Primary Examiner* — Jordan Schwartz
(74) *Attorney, Agent, or Firm* — ;Rossi, Kimms & McDowell LLP

(57) ABSTRACT

A zoom lens system includes, in order from object-side to image-side a positive first lens unit, a second negative lens unit, a third lens unit, and a fourth positive lens unit. The fourth unit includes a front subunit having positive power and a rear subunit having positive power. The following conditions are satisfied:
$-2.100 \times 10^{-3} \times vd + 0.693 < \theta gF$; $0.555 < \theta gF < 0.900$; $0.8 < (vfp/vfn)/(vrp/vrn) < 4.0$; $0.8 < |\{(\theta fn - \theta fp)/(vfp - vfn)\}/\{(\theta rn - \theta rp)/(vrp - vrn)\}|$, where $vd$ and $\theta gF$ indicate Abbe number and partial dispersion ratio of a lens included in the rear subunit, respectively, and where $vfp$, $\theta fp$, $vfn$ and $\theta fn$ indicate averages of Abbe number and partial dispersion ratio of positive lenses and averages of Abbe number and partial dispersion ratio of negative lenses included in the front subunit, respectively; $vrp$, $\theta rp$, $vrn$ and $\theta rn$ indicate averages of Abbe number and partial dispersion ratio of positive lenses and averages of Abbe number and partial dispersion ratio of negative lenses included in the rear subunit, respectively.

15 Claims, 18 Drawing Sheets

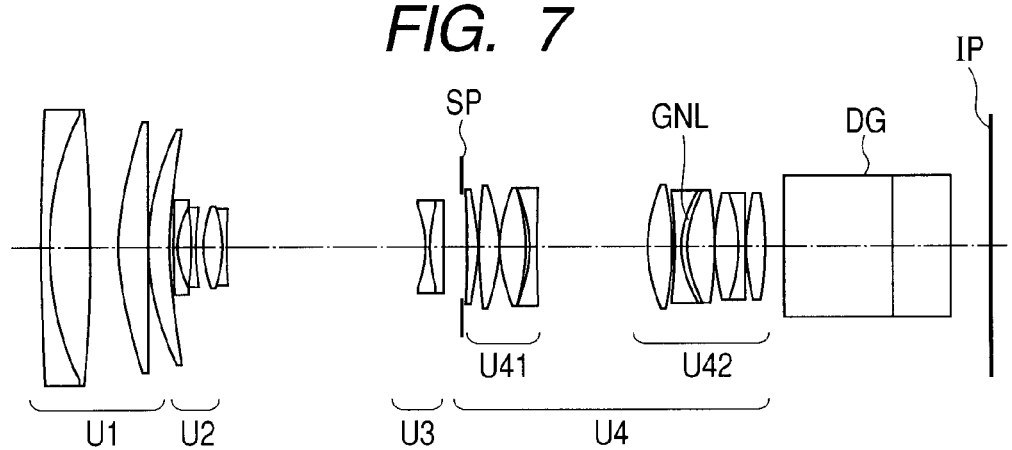
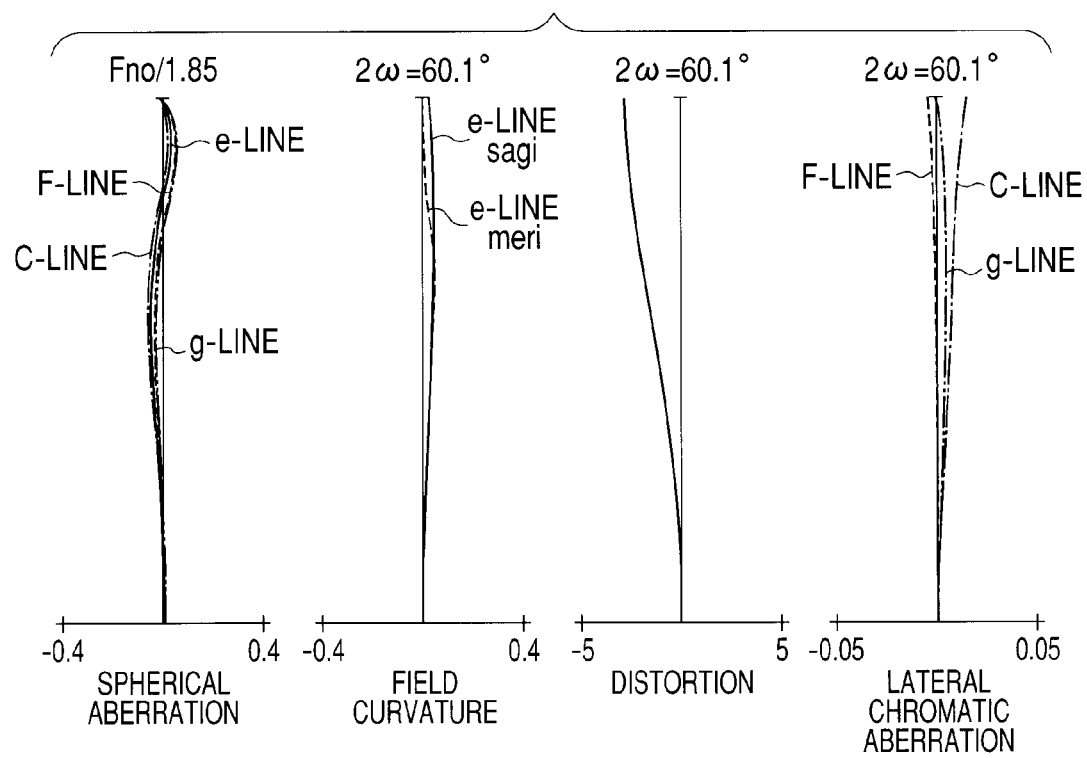

ZOOM LENS SYSTEM AND IMAGE PICKUP APPARATUS INCLUDING THE SAME

BACKGROUND OF THE INVENTION

1. Field of the Invention

The present invention relates to a zoom lens system and an image pickup apparatus including the same, which is suitable for use in a television camera for broadcasting, a video camera, a digital still camera, and a silver-halide camera.

2. Description of the Related Art

In recent years, there have been demanded a zoom lens system having a large diameter ratio, a high zoom ratio, and high optical performance for image pickup apparatuses such as a television camera, a silver-halide camera, a digital camera, and a video camera.

A positive lead and telephoto type four-unit zoom lens system in which four lens units are provided in total and one of the lens units located closest to an object side has a positive refractive power has been known as the zoom lens system having a high zoom ratio. For example, U.S. Pat. No. 7,304,805 and Japanese Patent Application Laid-Open No. 2005-084409 disclose a four-unit zoom lens system which includes a first lens unit having a positive refractive power, a second lens unit having a negative refractive power, a third lens unit having a negative refractive power, and a fourth lens unit having a positive refractive power.

U.S. Pat. No. 7,304,805 and Japanese Patent Application Laid-Open No. 2005-084409 disclose a four-unit zoom lens system in which an optical material having extraordinary dispersion is used to excellently correct a chromatic aberration, to thereby obtain high optical performance.

When the optical material having extraordinary dispersion is used for the four-unit zoom lens system as described above, a lateral chromatic aberration and an axial chromatic aberration are excellently and easily corrected. In order to obtain high optical performance, it is important to excellently correct a lateral chromatic aberration at a wide angle end and an axial chromatic aberration at a telephoto end.

For example, in order to correct the lateral chromatic aberration at the wide angle end, the optical material having extraordinary dispersion only needs to be used for a lens which is located in an image plane side of an aperture stop and has a positive power (refractive power). However, in a case of an optical system having a relatively small F-number, the lens has no small effect on an on-axial beam, and hence the axial chromatic aberration tends to be overcorrected (axial chromatic aberration is excessively corrected).

When the optical material having extraordinary dispersion is used to correct the lateral chromatic aberration at the wide angle end, the axial chromatic aberration tends to deteriorate in the entire zoom range. In order to increase the optical performance of the four-unit zoom lens system as described above over the entire zoom range, it is important to suitably set a lens structure of the fourth lens unit which does not move for zooming.

SUMMARY OF THE INVENTION

It is an object of the present invention to provide a zoom lens system in which an axial chromatic aberration and a lateral chromatic aberration are excellently corrected over the entire zoom range to obtain high optical performance, and an image pickup apparatus including the zoom lens system.

Therefore, according to an aspect of the present invention, there is provided a zoom lens system including, in order from an object side to an image side: a first lens unit which does not move for zooming and has a positive refractive power; a second lens unit which moves to the image side during zooming from a wide angle end to a telephoto end and has a negative refractive power; a third lens unit which moves on an optical axis in conjunction with the movement of the second lens unit and has a negative refractive power; and a fourth lens unit which does not move during zooming and has a positive refractive power, in which: the fourth lens unit constituted by a front lens subunit having a positive refractive power and a rear lens subunit having a positive refractive power with an air interval therebetween, the air interval being a maximum length in the fourth lens unit; the rear lens subunit includes a lens GNL formed of a material having a characteristic satisfying:

$$-2.100 \times 10^{-3} \times \nu d + 0.693 < \theta gF; \text{ and}$$

$$0.555 < \theta gF < 0.900,$$

where $\nu d$ indicates an Abbe number of the material and $\theta gF$ indicates a partial dispersion ratio of the material; and the fourth lens unit satisfies the following conditions:

$$0.8 < (\nu fp/\nu fn)/(\nu rp/\nu rn) < 4.0; \text{ and}$$

$$0.8 < |\{(\theta fn - \theta fp)/(\nu fp - \nu fn)\}/\{(\theta rn - \theta rp)/(\nu rp - \nu rn)\}|,$$

where $\nu fp$ and $\nu fp$ indicate an average value of Abbe number and an average value of partial dispersion ratio of materials of the positive lenses included in the front lens subunit, respectively, $\nu fn$ and $\theta fn$ indicate an average value of Abbe number and an average value of partial dispersion ratio of materials of the negative lenses included in the front lens subunit, respectively, $\nu rp$ and $\theta rp$ indicate an average value of Abbe number and an average value of partial dispersion ratio of materials of the positive lenses included in the rear lens subunit, respectively, $\nu rn$ and $\theta rn$ indicate an average value of Abbe number and an average value of partial dispersion ratio of materials of the negative lenses included in the rear lens subunit, respectively.

According to another aspect of the present invention, there is provided an image pickup apparatus including: an image pickup element for receiving an image of a subject; and a zoom lens system for forming the image of the subject on the image pickup element, in which: the zoom lens system includes, in order from a subject side to an image side: a first lens unit which does not move for zooming and has a positive refractive power; a second lens unit which moves to the image side during zooming from a wide angle end to a telephoto end and has a negative refractive power; a third lens unit which moves on an optical axis in conjunction with the movement of the second lens unit and has a negative refractive power; and a fourth lens unit which does not move during zooming and has a positive refractive power; the fourth lens unit is constituted by a front lens subunit having a positive refractive power and a rear lens subunit having a positive refractive power with an air interval therebetween, the air interval being a maximum length in the fourth lens unit; the rear lens subunit includes a lens GNL formed of a material having a characteristic satisfying:

$$-2.100 \times 10^{-3} \times \nu d + 0.693 < \theta gF; \text{ and}$$

$$0.555 < \theta gF < 0.900,$$

where $\nu d$ indicates an Abbe number of the material and $\theta gF$ indicates a partial dispersion ratio of the material; and the fourth lens unit satisfies the following conditions:

$$0.8 < (\nu fp/\nu fn)/(\nu rp/\nu rn) < 4.0; \text{ and}$$

$$0.8 < |\{(\theta fn - \theta fp)/(\nu fp - \nu fn)\}/\{(\theta rn - \theta rp)/(\nu rp - \nu rn)\}|,$$

where νfp and νfp indicate an average value of Abbe number and an average value of partial dispersion ratio of materials of the positive lenses included in the front lens subunit, respectively, νfn and θfn indicate an average value of Abbe number and an average value of partial dispersion ratio of materials of the negative lenses included in the front lens subunit, respectively, νrp and θrp indicate an average value of Abbe number and an average value of partial dispersion ratio of materials of the positive lenses included in the rear lens subunit, respectively, νrn and θrn indicate an average value of Abbe number and an average value of partial dispersion ratio of materials of the negative lenses included in the rear lens subunit, respectively.

Further features of the present invention become apparent from the following description of exemplary embodiments with reference to the attached drawings.

BRIEF DESCRIPTION OF THE DRAWINGS

FIG. 7 is a cross sectional view illustrating a zoom lens system according to Embodiment 4 of the present invention in a state of focusing on the infinite-distance object at the wide angle end.

FIG. 8A is a longitudinal aberration graph in Numerical Embodiment 4 of the present invention when the object distance is 2.5 m at the wide angle end.

DESCRIPTION OF THE EMBODIMENTS

Preferred embodiments of the present invention will now be described in detail in accordance with the accompanying drawings.

A zoom lens system according to the present invention includes, in order of from an object side to an image side, a first lens unit U1 having a positive refractive power and a second lens unit U2 having a negative refractive power. The first lens unit U1 does not move for zooming. The second lens unit U2 moves to the image side during zooming from a wide angle end (short-focal length end) to a telephoto end (long-focal length end). The meaning of "the first lens unit U1 does not move for zooming" is that the first lens unit is not operated for the purpose of zooming, but the first lens unit may be moved for focusing in a case where zooming and focusing are simultaneously performed. The zoom lens system further includes a third lens unit U3 having a negative refractive power and a fourth lens unit U4 having a positive refractive power. The third lens unit U3 moves on an optical axis in conjunction with the movement of the second lens unit U2 to correct an image plane variation due to magnification varying. The fourth lens unit U4 has an imaging action and does not move during zooming.

The fourth lens unit includes a front lens subunit U41 having a positive refractive power and a rear lens subunit U42 having a positive refractive power which are provided at a maximum air interval. Lens materials are suitably specified for the front lens subunit U41 and the rear lens subunit U42.

Figure 1:
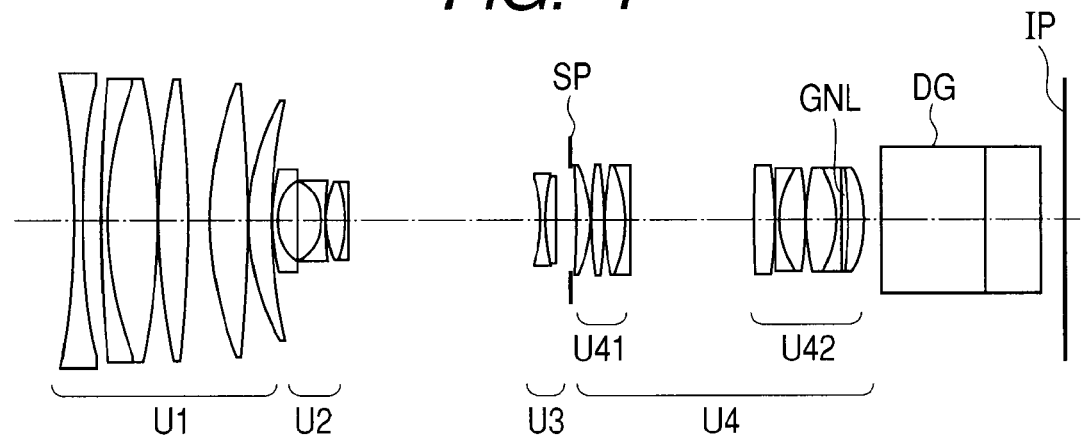
FIG. 1 is a cross sectional view illustrating a zoom lens system according to Embodiment 1 of the present invention in a state of focusing on an infinite-distance, object at a wide angle end.
Figure 2A:
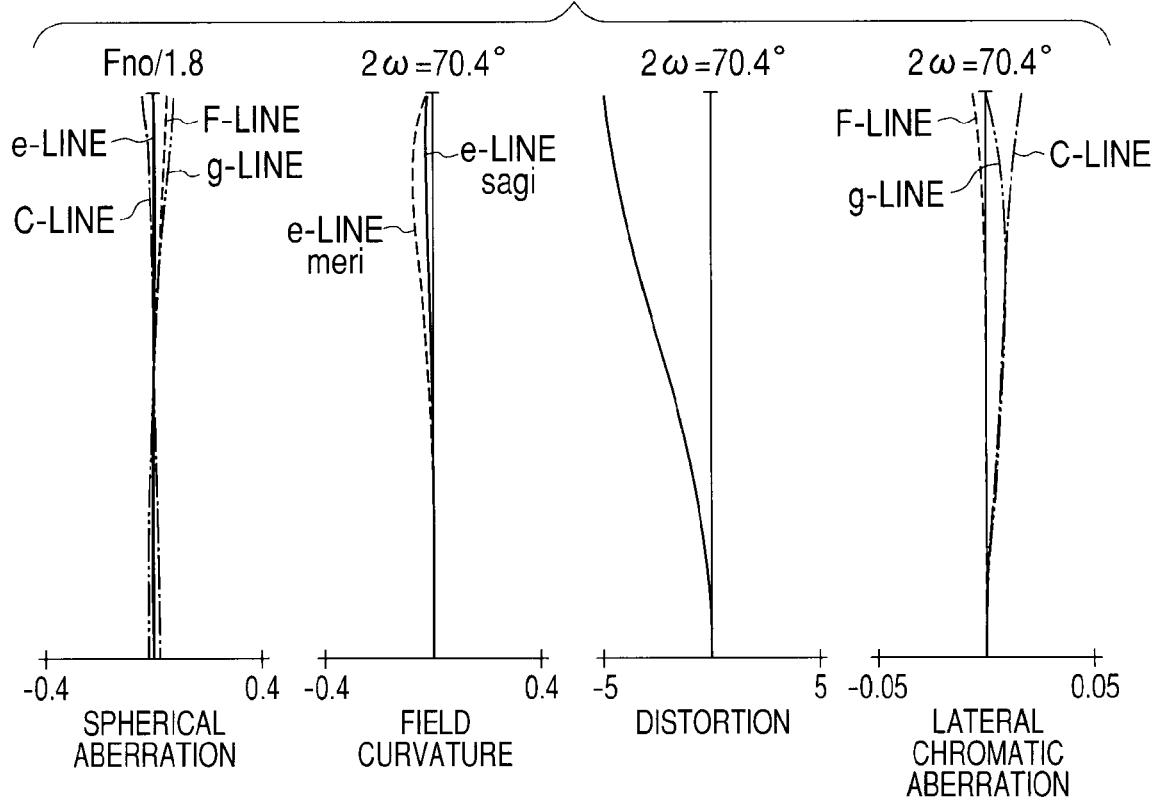
FIG. 2A is a longitudinal aberration graph in Numerical Embodiment 1 of the present invention when an object distance is 2.5 m at the wide angle end.
Figure 2B:
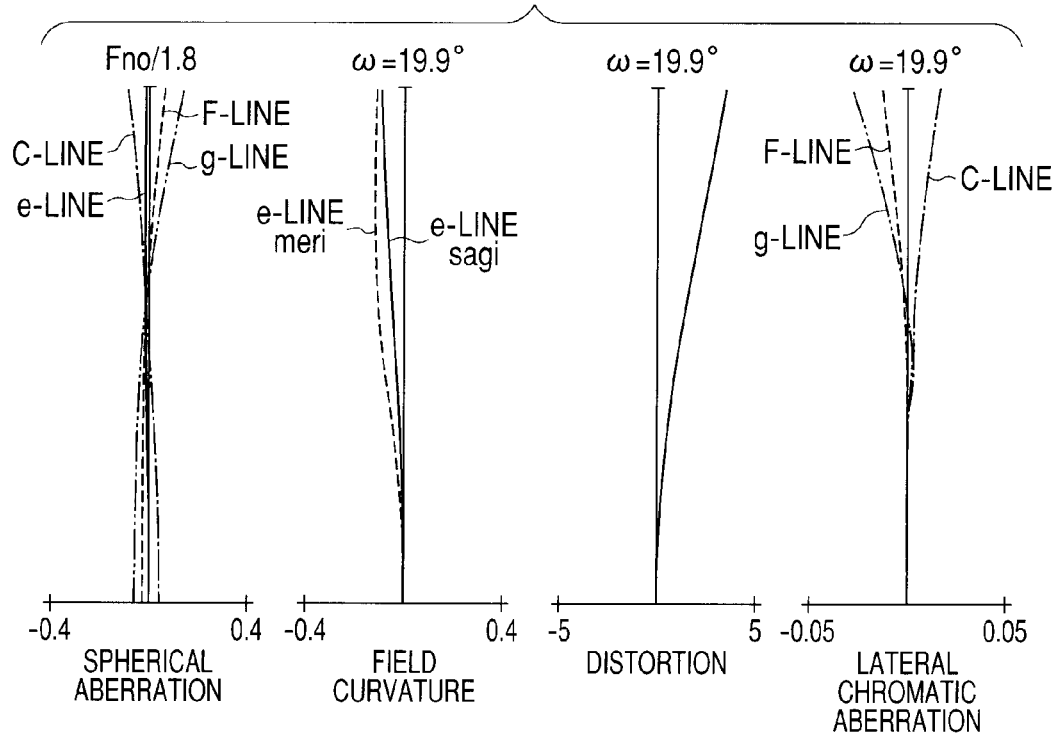
FIG. 2B is a longitudinal aberration graph in Numerical Embodiment 1 when the object distance is 2.5 m at a focal length of 31.67 mm.
Figure 2C:
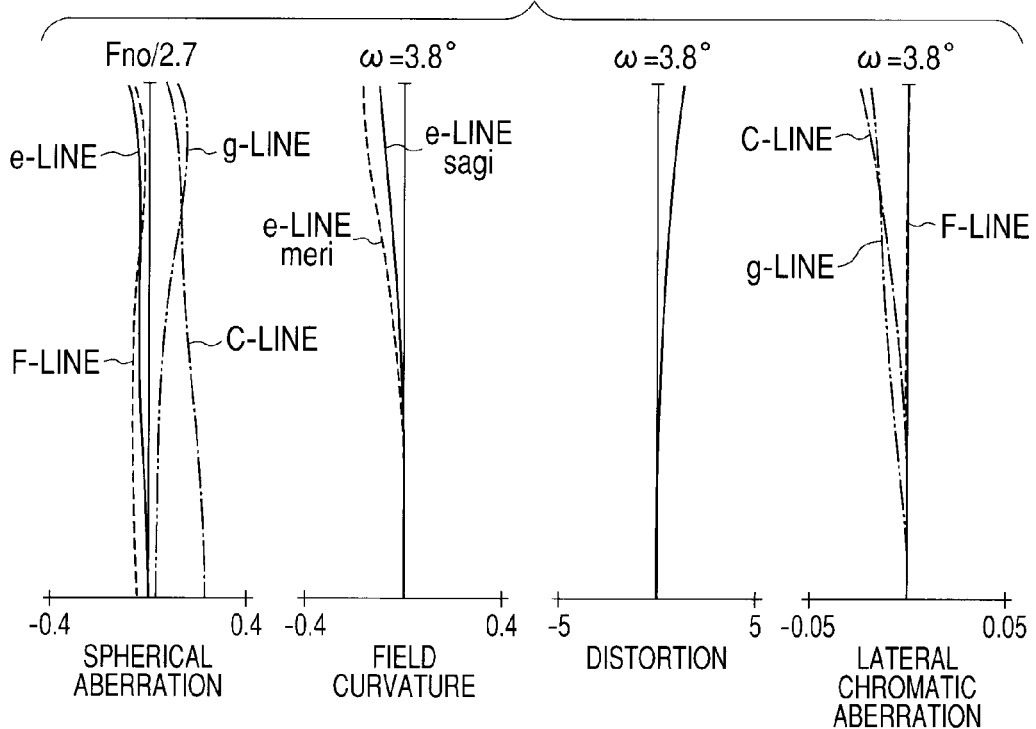
FIG. 2C is a longitudinal aberration graph in Numerical Embodiment 1 when the object distance is 2.5 m at a telephoto end.

FIG. 1 is a lens cross sectional view in a case where a zoom lens system according to Embodiment 1 (Numerical Embodiment 1) of the present invention is focused on an infinite-distance object at the wide angle end. FIGS. 2A, 2B, and 2C are longitudinal aberration diagrams in Numerical Embodiment 1 in focusing cases where an object distance is 2.5 m at the wide angle end, a focal length of 31.67 mm, and a telephoto end, respectively.

The focal length and the object distance are values indicated in units of mm in the numerical embodiments described later. The object distance is a distance from an image plane. The values are the same as in each of the following embodiments.

Figure 3:
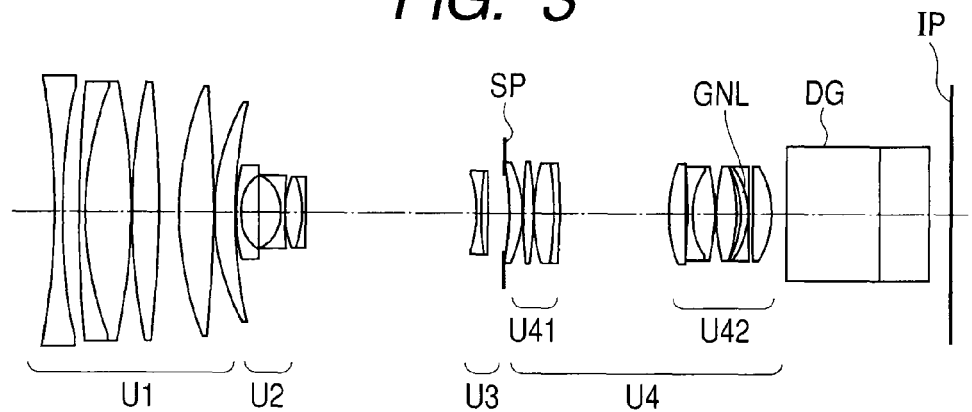
FIG. 3 is a cross sectional view illustrating a zoom lens system according to Embodiment 2 of the present invention in a state of focusing on the infinite-distance object at the wide angle end.
Figure 4A:
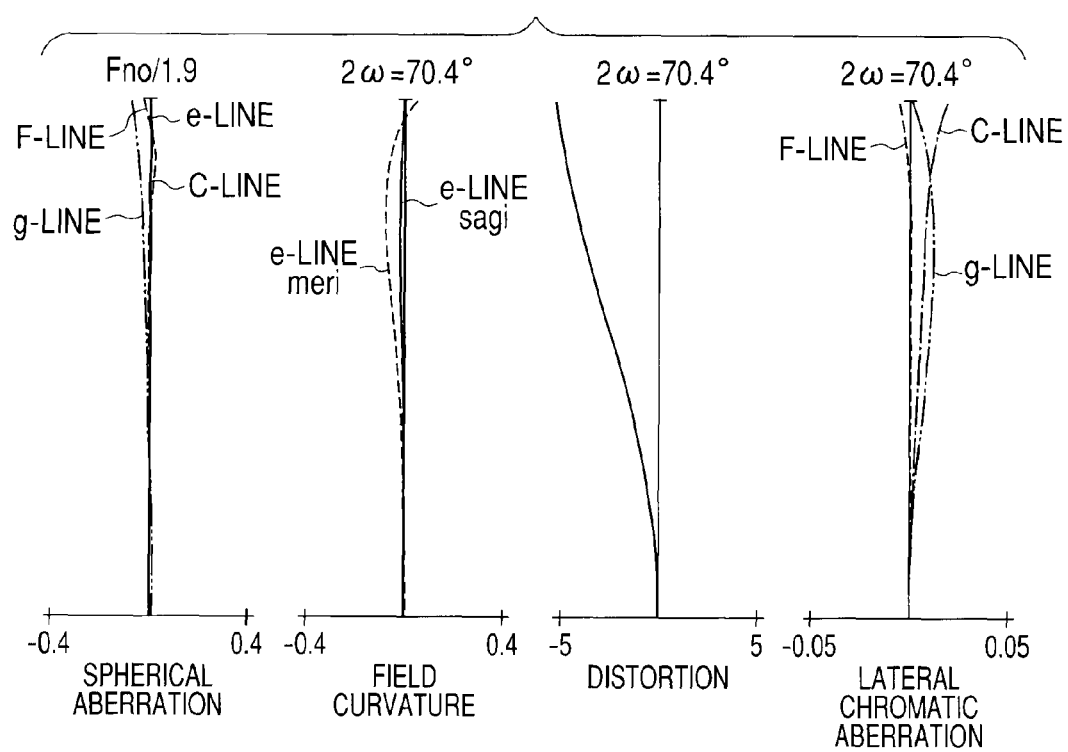
FIG. 4A is a longitudinal aberration graph in Numerical Embodiment 2 of the present invention when the object distance is 2.5 m at the wide angle end.
Figure 4B:
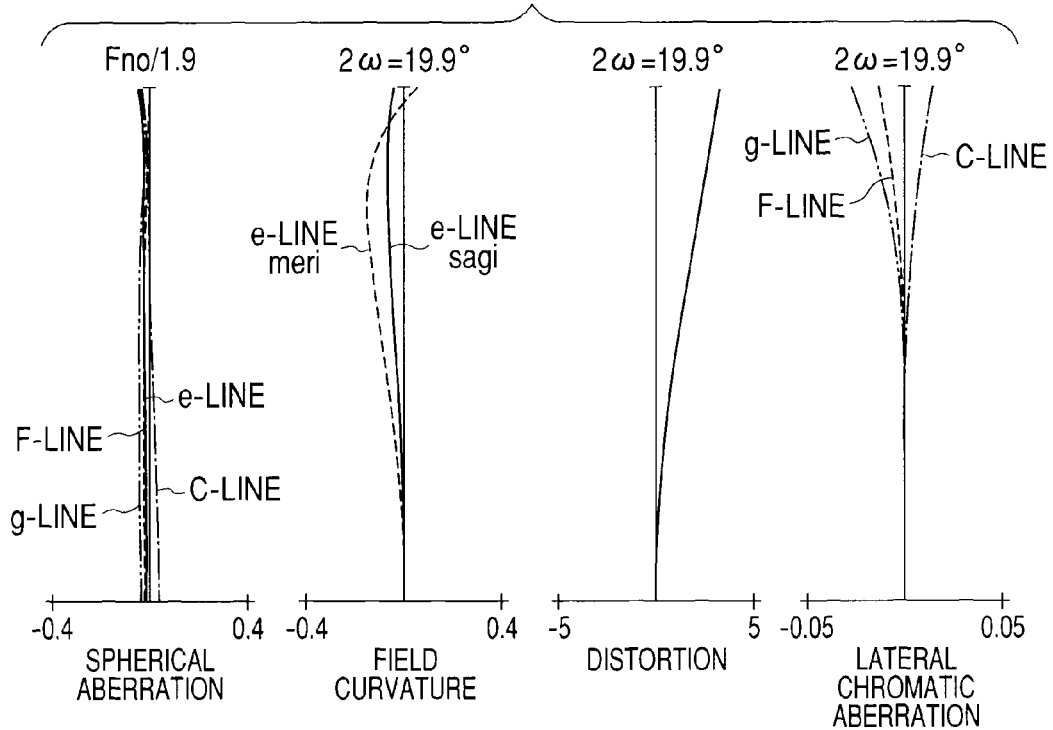
FIG. 4B is a longitudinal aberration graph in Numerical Embodiment 2 when the object distance is 2.5 m at the focal length of 31.67 mm.
Figure 4C:
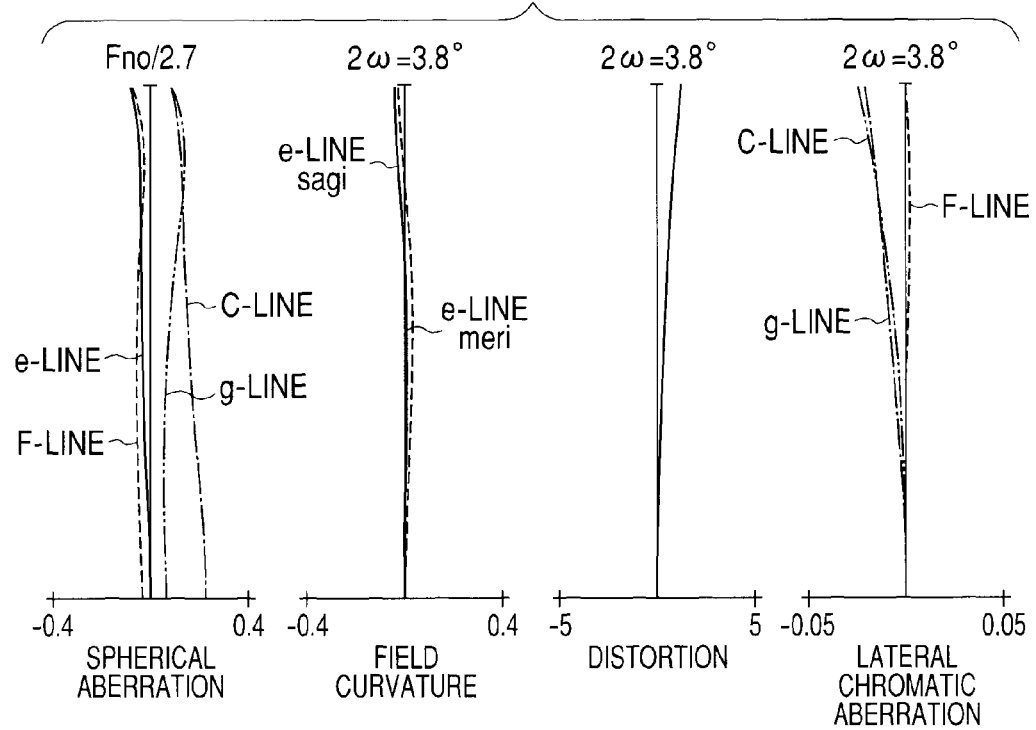
FIG. 4C is a longitudinal aberration graph in Numerical Embodiment 2 when the object distance is 2.5 m at the telephoto end.

FIG. 3 is a lens cross sectional view in a case where a zoom lens system according to Embodiment 2 (Numerical Embodiment 2) of the present invention is focused on the infinite-distance object at the wide angle end. FIGS. 4A, 4B, and 4C are longitudinal aberration diagrams in Numerical Embodiment 2 in focusing cases where the object distance is 2.5 m at the wide angle end, the focal length of 31.67 mm, and the telephoto end, respectively.

Figure 5:
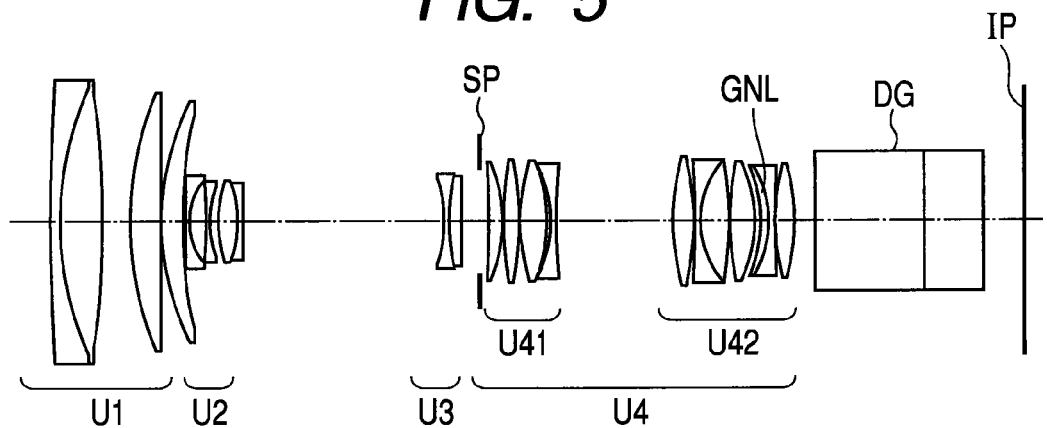
FIG. 5 is a cross sectional view illustrating a zoom lens system according to Embodiment 3 of the present invention in a state of focusing on the infinite-distance object at the wide angle end.
Figure 6A:
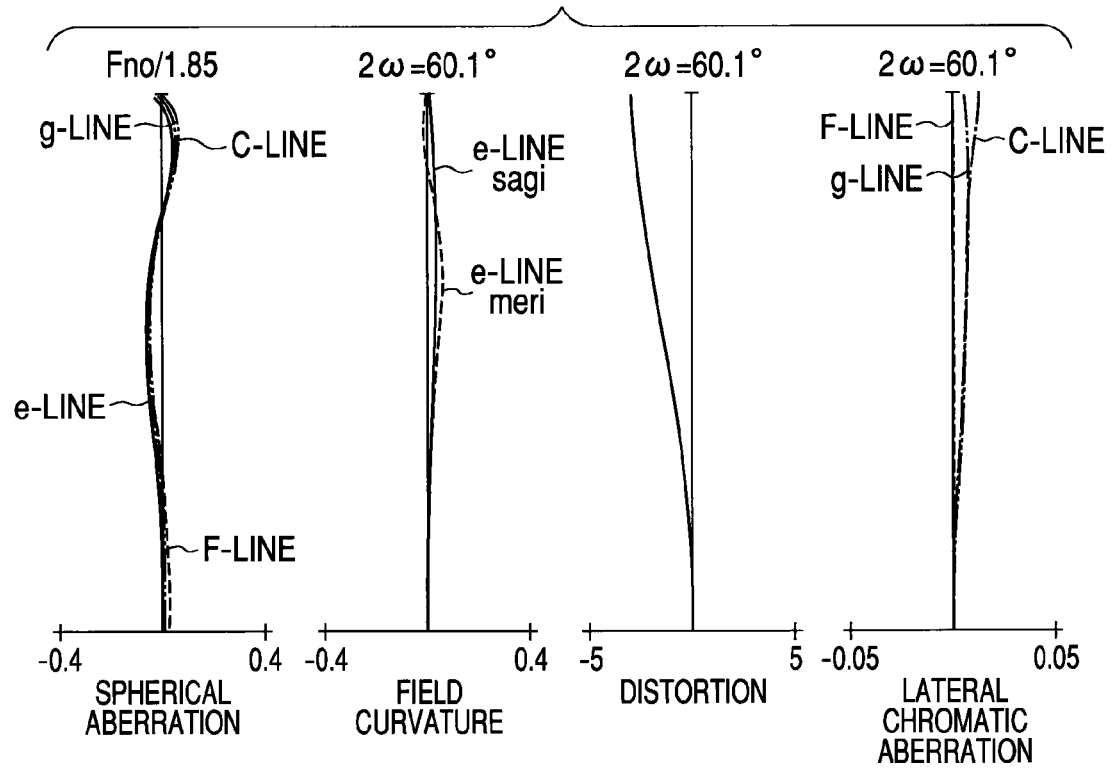
FIG. 6A is a longitudinal aberration graph in Numerical Embodiment 3 of the present invention when the object distance is 2.5 m at the wide angle end.
Figure 6B:
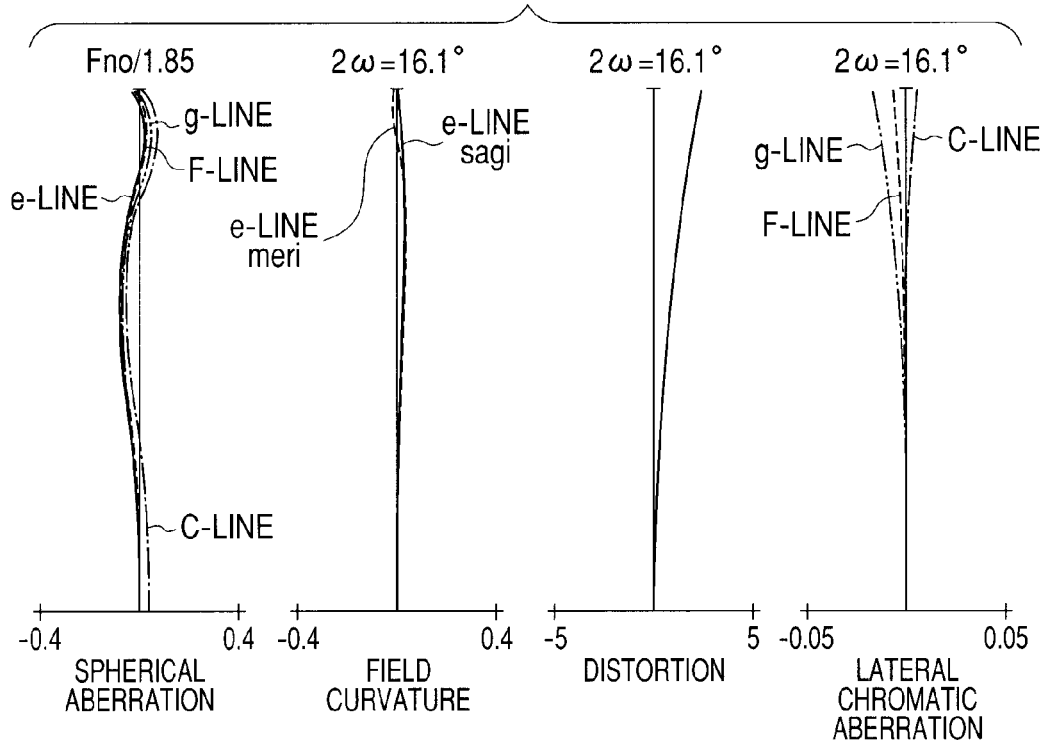
FIG. 6B is a longitudinal aberration graph in Numerical Embodiment 3 when the object distance is 2.5 m at a focal length of 38.86 mm.
Figure 6C:
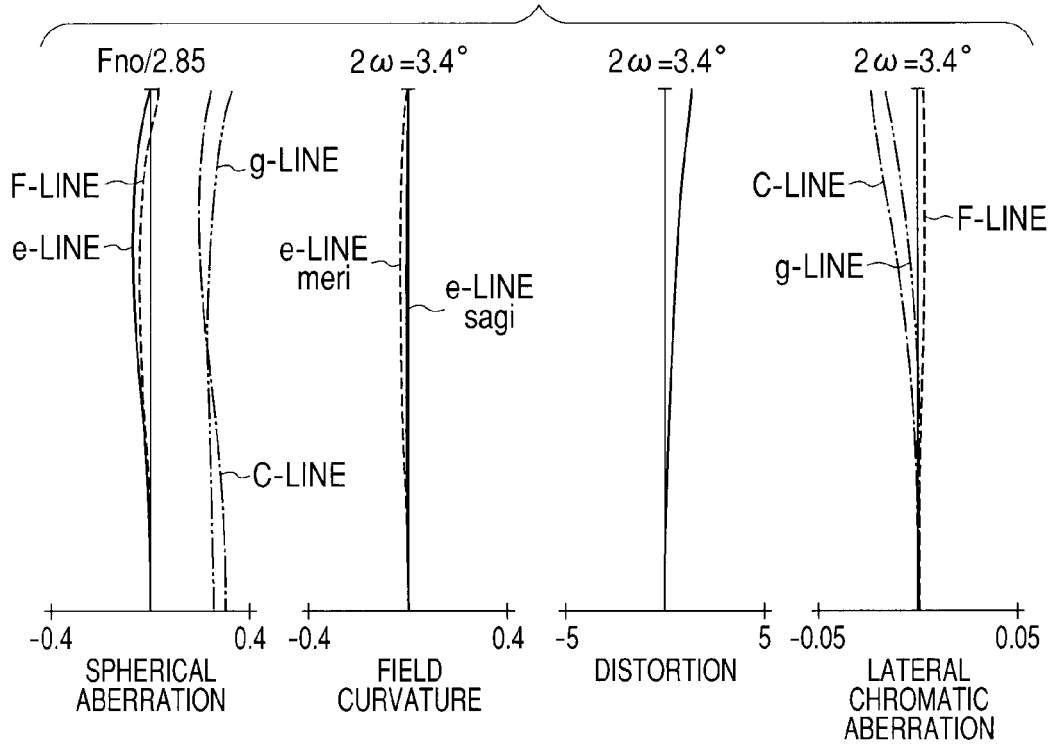
FIG. 6C is a longitudinal aberration graph in Numerical Embodiment 3 when the object distance is 2.5 m at the telephoto end.

FIG. 5 is a lens cross sectional view in a case where a zoom lens system according to Embodiment 3 (Numerical Embodiment 3) of the present invention is focused on the infinite-distance object at the wide angle end. FIGS. 6A, 6B, and 6C are longitudinal aberration diagrams in Numerical Embodiment 3 in focusing cases where the object distance is 2.5 m at the wide angle end, the focal length of 38.86 mm, and the telephoto end, respectively.

Figure 8B:
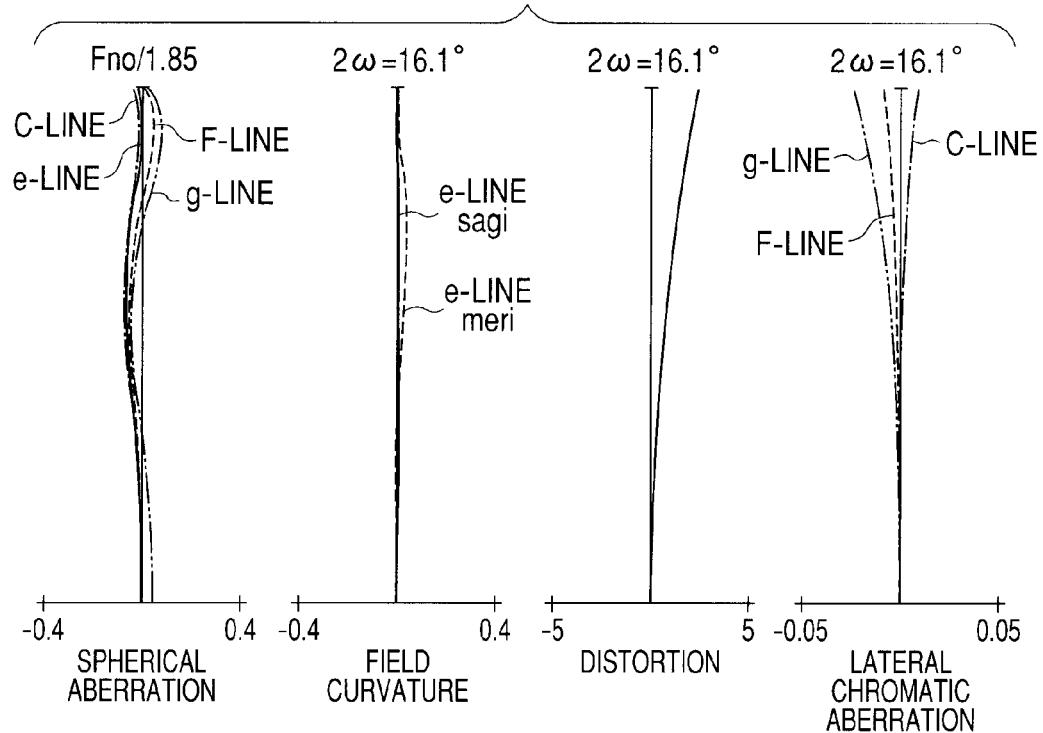
FIG. 8B is a longitudinal aberration graph in Numerical Embodiment 4 when the object distance is 2.5 m at the focal length of 38.86 mm.
Figure 8C:
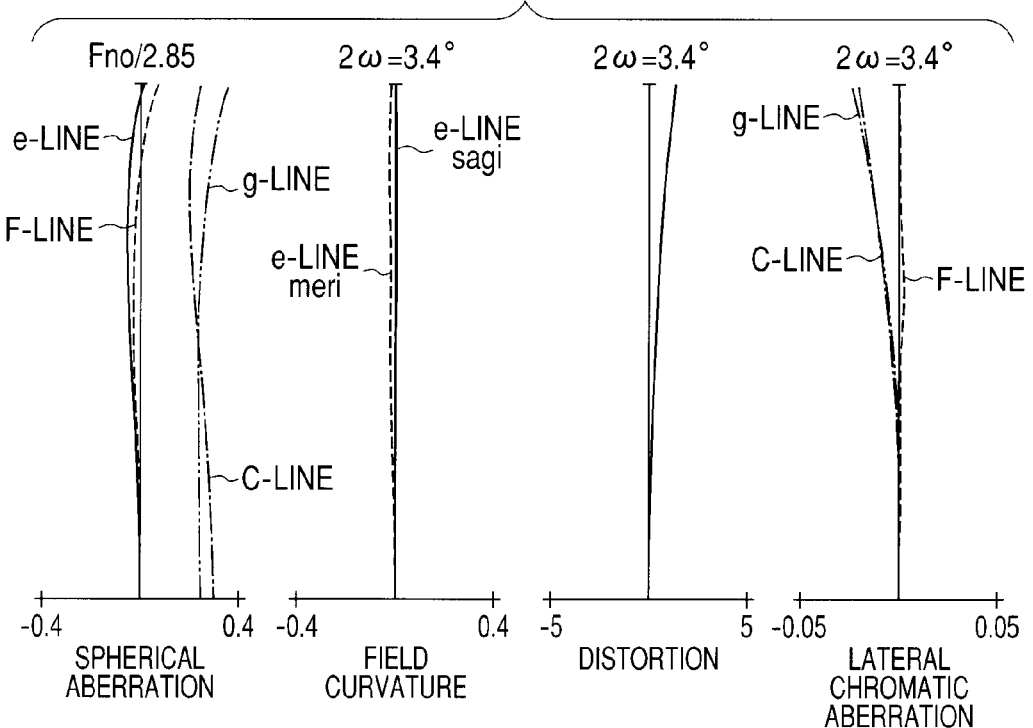
FIG. 8C is a longitudinal aberration graph in Numerical Embodiment 4 when the object distance is 2.5 m at the telephoto end.

FIG. 7 is a lens cross sectional view in a case where a zoom lens system according to Embodiment 4 (Numerical Embodiment 4) of the present invention is focused on the infinite-distance object at the wide angle end. FIGS. 8A, 8B, and 8C are longitudinal aberration diagrams in Numerical Embodiment 4 in focusing cases where the object distance is 2.5 m at the wide angle end, the focal length of 38.86 mm, and the telephoto end, respectively.

Figure 9:
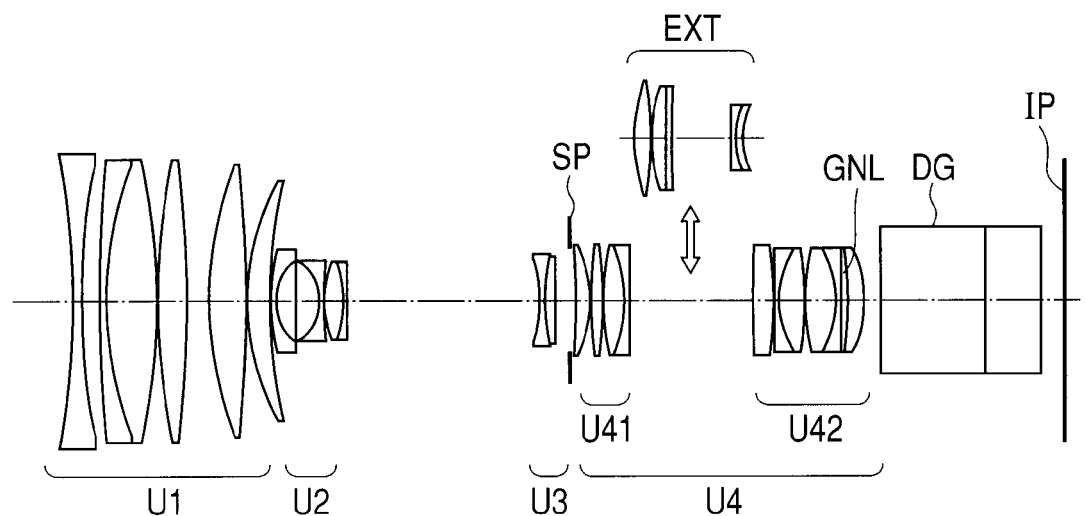
FIG. 9 is a cross sectional view illustrating a zoom lens system according to Embodiment 5 of the present invention in a state of focusing on the infinite-distance object at the wide angle end.
Figure 10A:
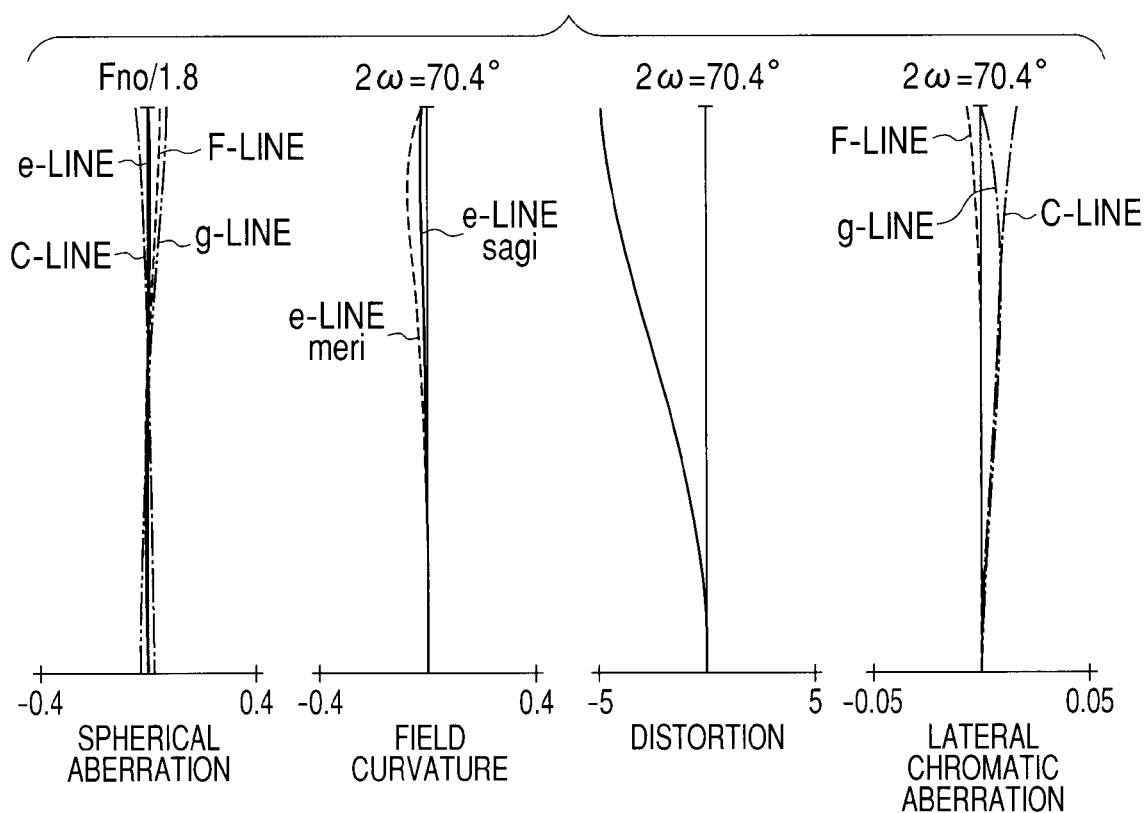
FIG. 10A is a longitudinal aberration graph in Numerical Embodiment 5 of the present invention when the object distance is 2.5 m at the wide angle end.
Figure 10B:
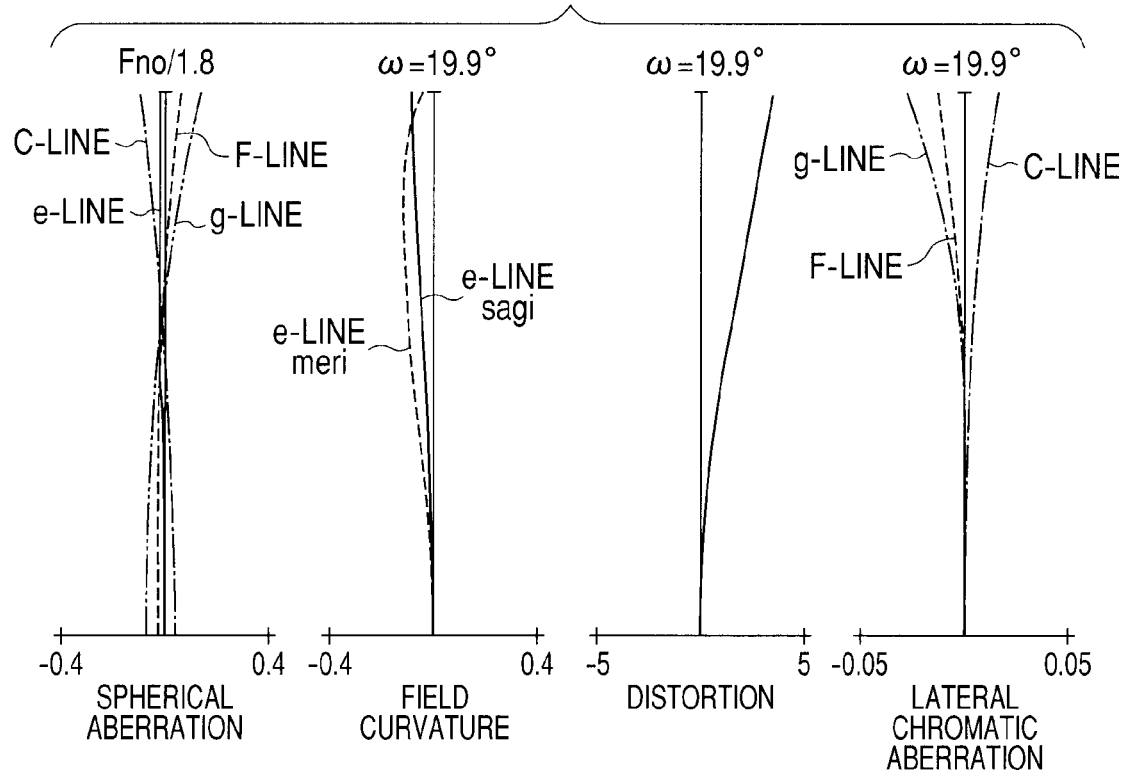
FIG. 10B is a longitudinal aberration graph in Numerical Embodiment 5 when the object distance is 2.5 m at the focal length of 31.67 mm.
Figure 10C:
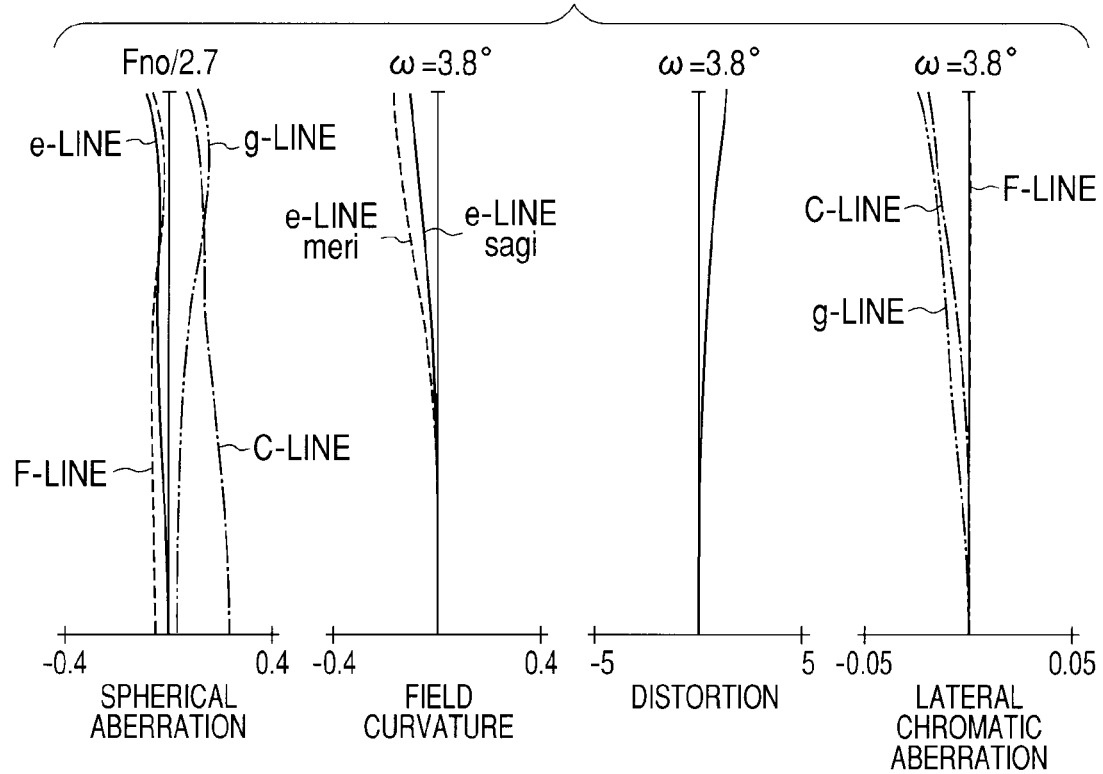
FIG. 10C is a longitudinal aberration graph in Numerical Embodiment 5 when the object distance is 2.5 m at the telephoto end.

FIG. 9 is a lens cross sectional view in a case where a zoom lens system according to Embodiment 5 (Numerical Embodiment 5) of the present invention is focused on the infinite-distance object at the wide angle end. FIGS. 10A, 10B, and 10C are longitudinal aberration diagrams in Numerical Embodiment 5 in focusing cases where the object distance is 2.5 m at the wide angle end, the focal length of 31.67 mm, and the telephoto end, respectively.

Figure 11A:
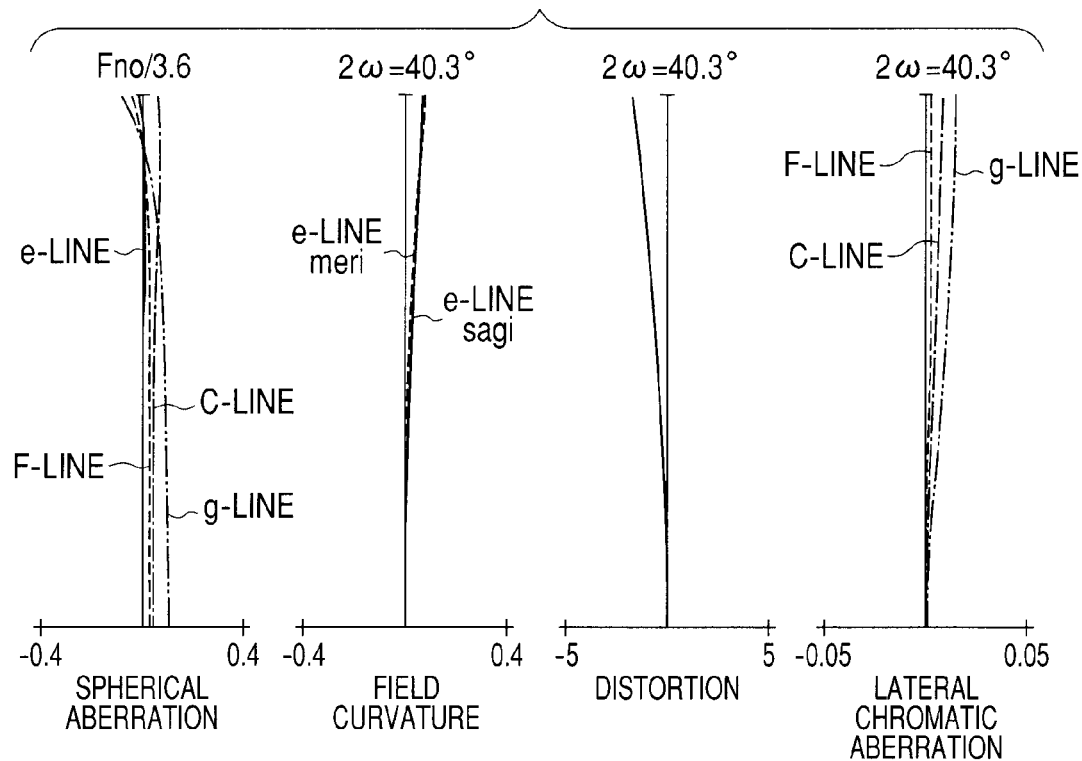
FIG. 11A is a longitudinal aberration graph in Numerical Embodiment 5 when the object distance is 2.5 m at the wide angle end during a magnification-varying optical system insertion state.
Figure 11B:
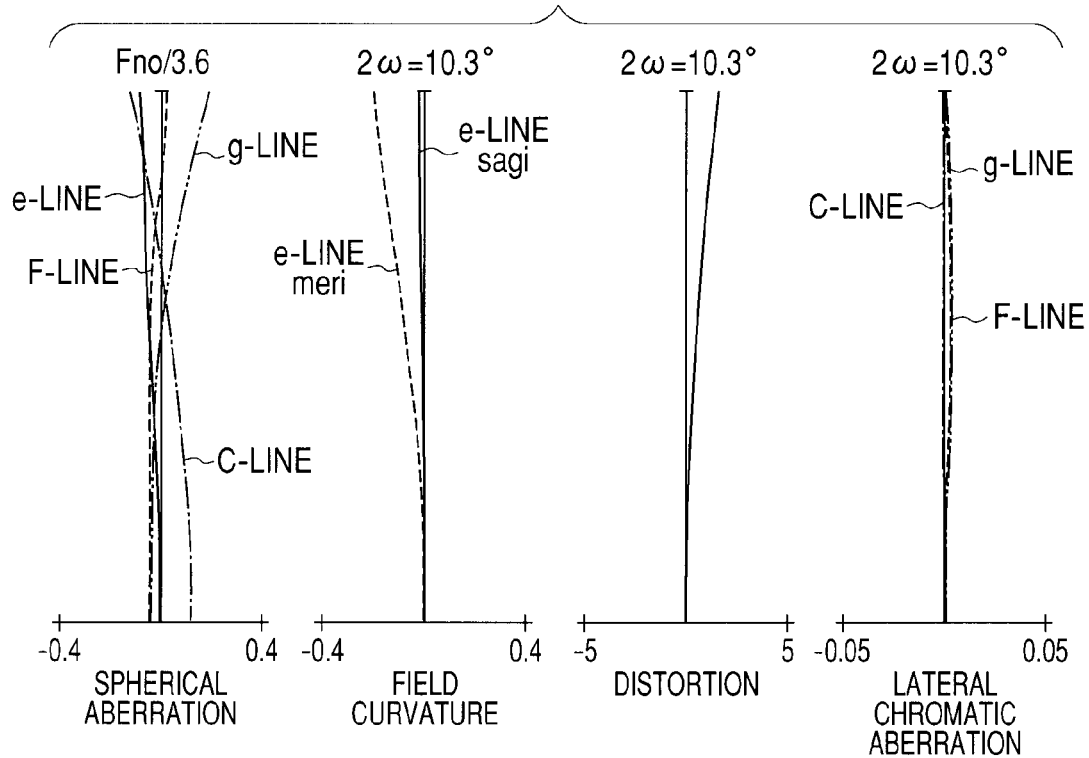
FIG. 11B is a longitudinal aberration graph in Numerical Embodiment 5 when the object distance is 2.5 m at a focal length of 60.9 mm during the magnification-varying optical system insertion state.
Figure 11C:
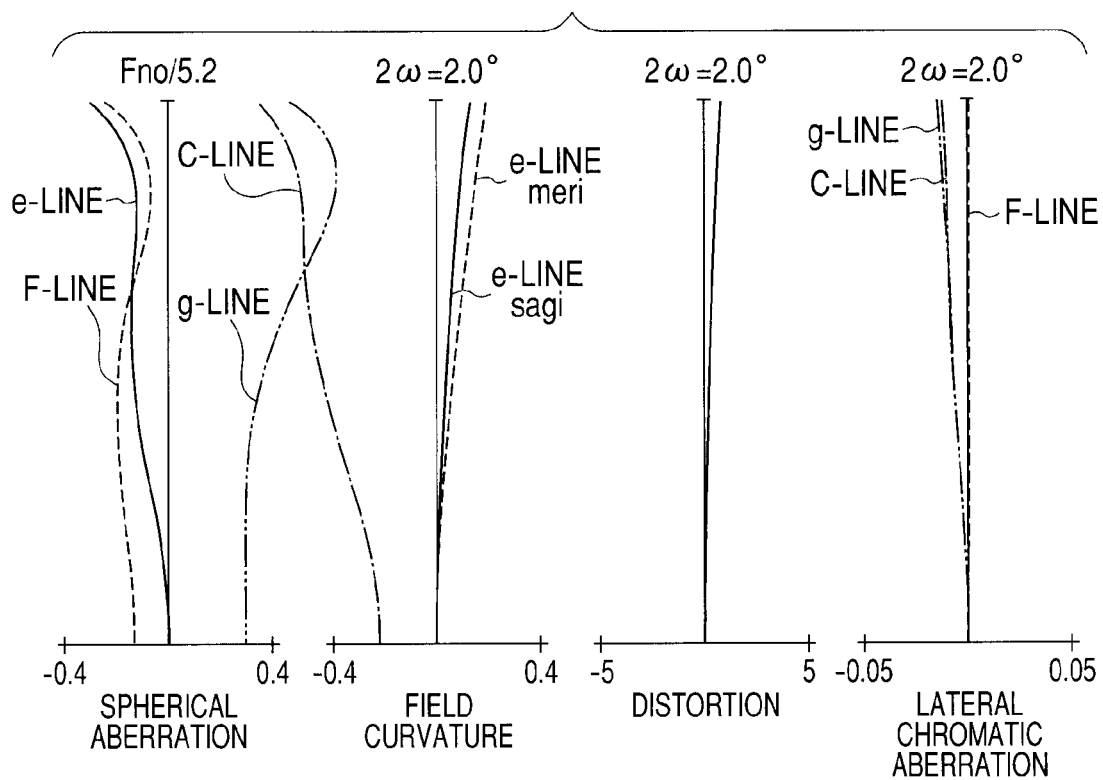
FIG. 11C is a longitudinal aberration graph in Numerical Embodiment 5 when the object distance is 2.5 m at the telephoto end during the magnification-varying optical system insertion state.

FIGS. 11A, 11B, and 11C are longitudinal aberration graphs in Embodiment 5 in focusing cases where the object distance is 2.5 m at the wide angle end, a focal length of 60.9 mm, and the telephoto end, respectively, while a magnification-varying optical system is inserted into the fourth lens unit.

Figure 12:
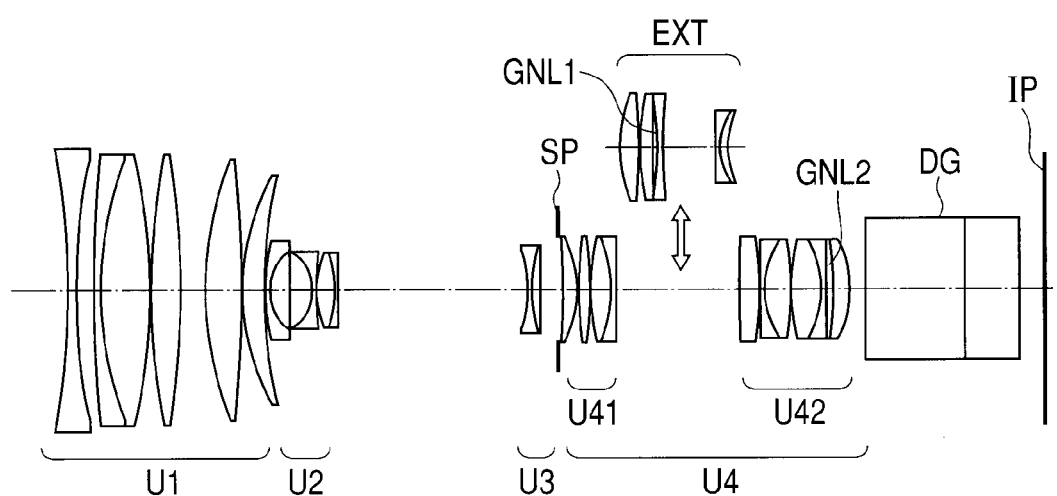
FIG. 12 is a cross sectional view illustrating a zoom lens system according to Embodiment 6 of the present invention in a state of focusing on the infinite-distance object at the wide angle end.

FIG. 12 is a lens cross sectional view in a case where a zoom lens system according to Embodiment 6 (Numerical Embodiment 6) of the present invention is focused on the infinite-distance object at the wide angle end.

Figure 13A:
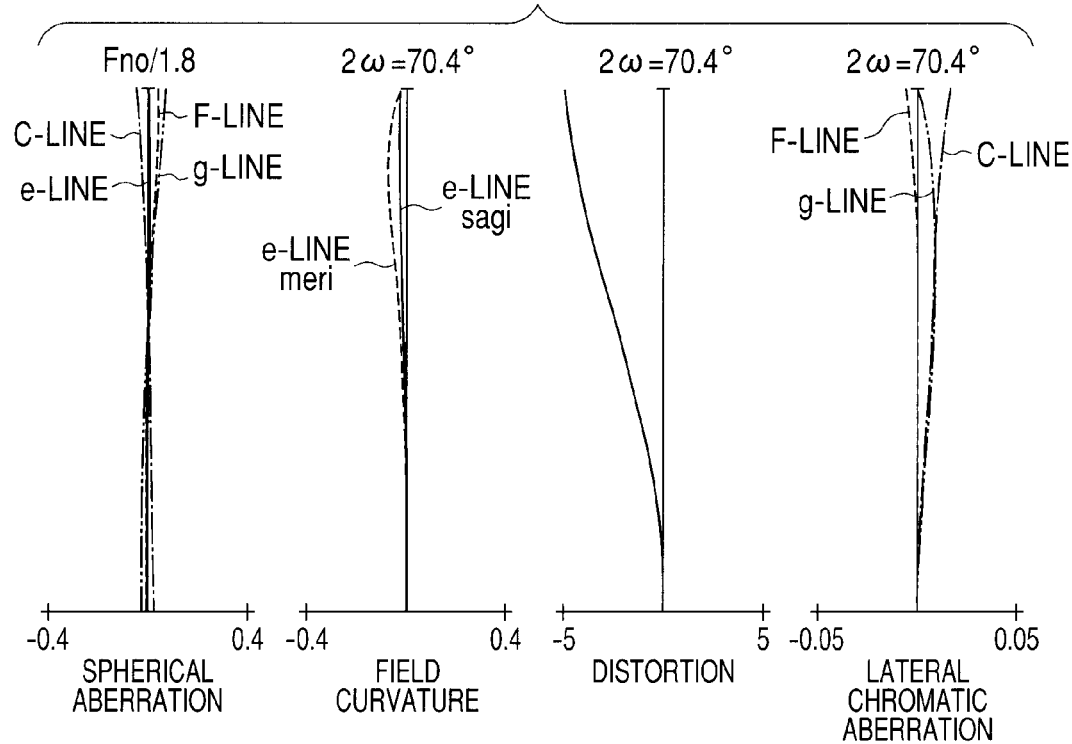
FIG. 13A is a longitudinal aberration graph in Numerical Embodiment 6 of the present invention when the object distance is 2.5 m at the wide angle end.
Figure 13B:
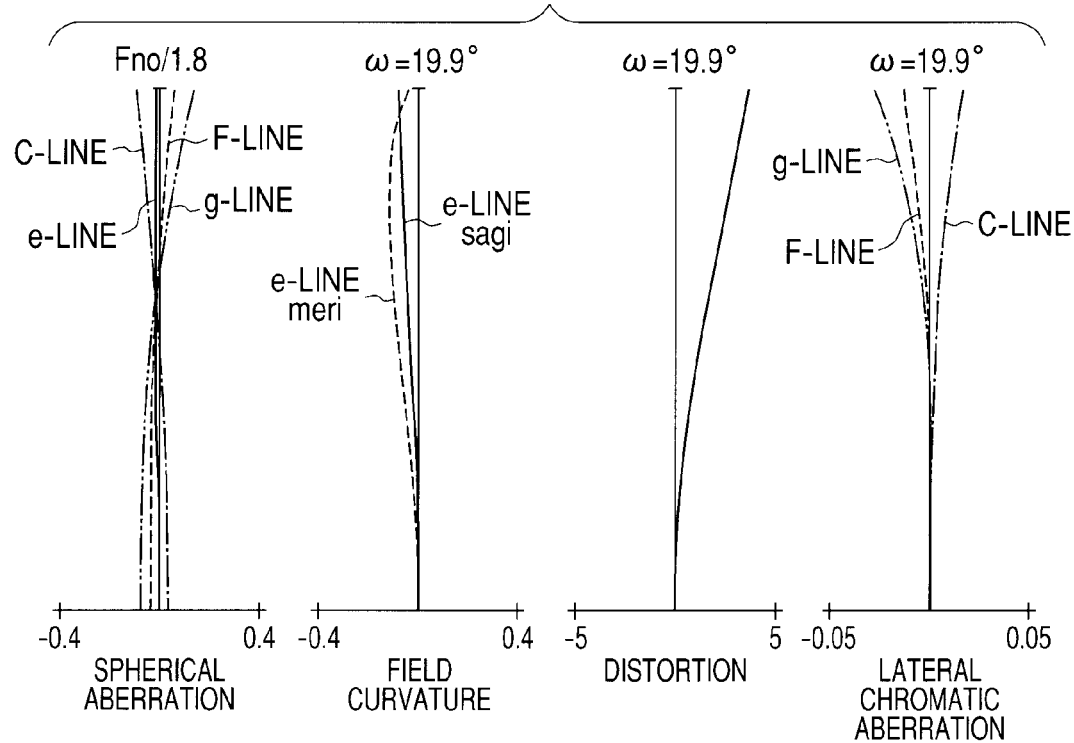
FIG. 13B is a longitudinal aberration graph in Numerical Embodiment 6 when the object distance is 2.5 m at the focal length of 31.67 mm.
Figure 13C:
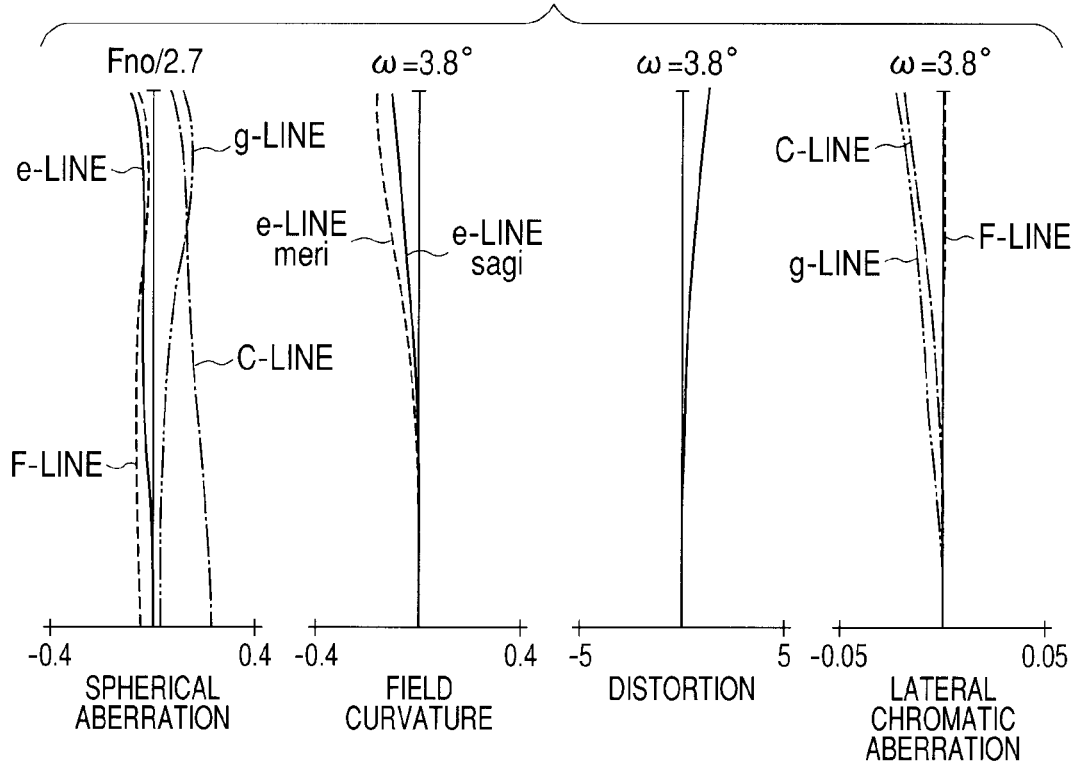
FIG. 13C is a longitudinal aberration graph in Numerical Embodiment 6 when the object distance is 2.5 m at the telephoto end.

FIGS. 13A, 13B, and 13C are longitudinal aberration diagrams in Numerical Embodiment 6 in focusing cases where the object distance is 2.5 m at the wide angle end, the focal length of 31.67 mm, and the telephoto end, respectively.

Figure 14A:
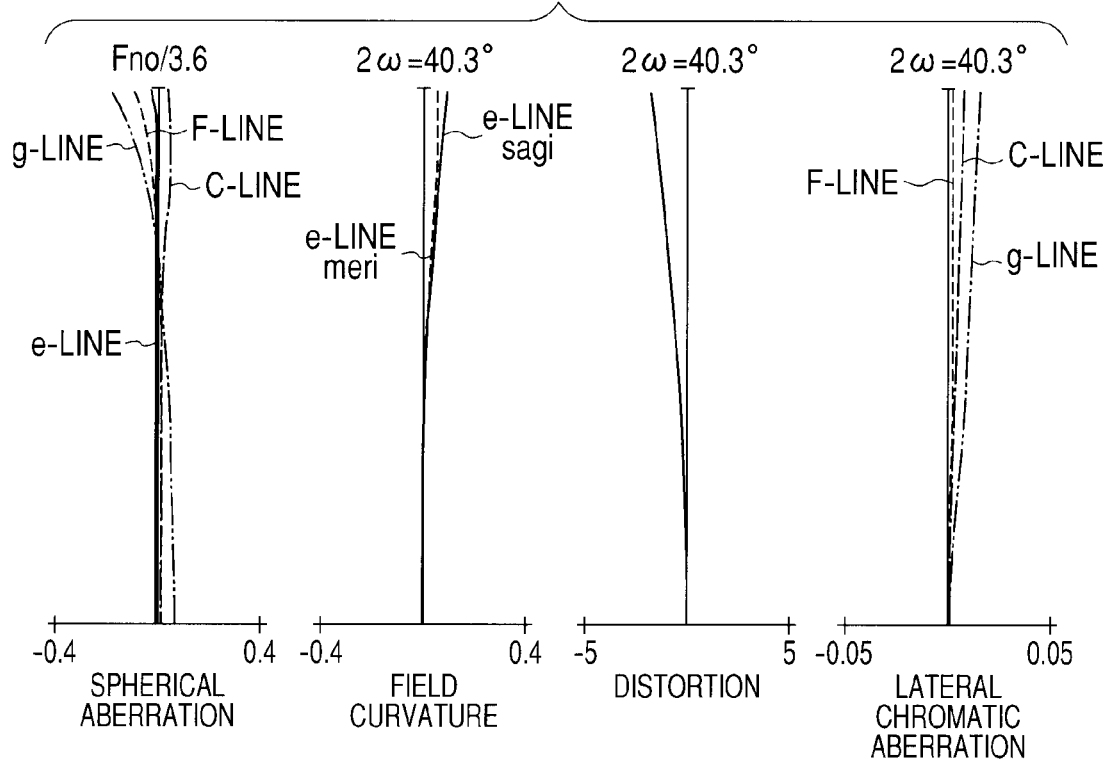
FIG. 14A is a longitudinal aberration graph in Numerical Embodiment 6 when the object distance is 2.5 m at the wide angle end during the magnification-varying optical system insertion state.
Figure 14B:
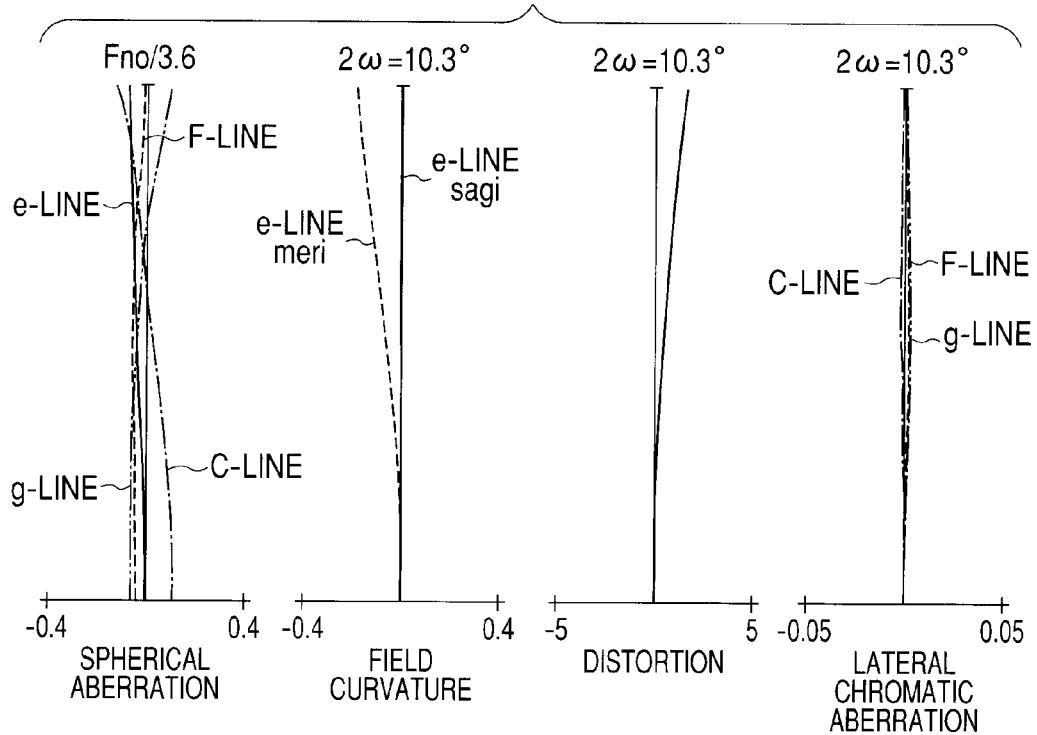
FIG. 14B is a longitudinal aberration graph in Numerical Embodiment 6 when the object distance is 2.5 m at the focal length of 60.9 mm during the magnification-varying optical system insertion state.
Figure 14C:
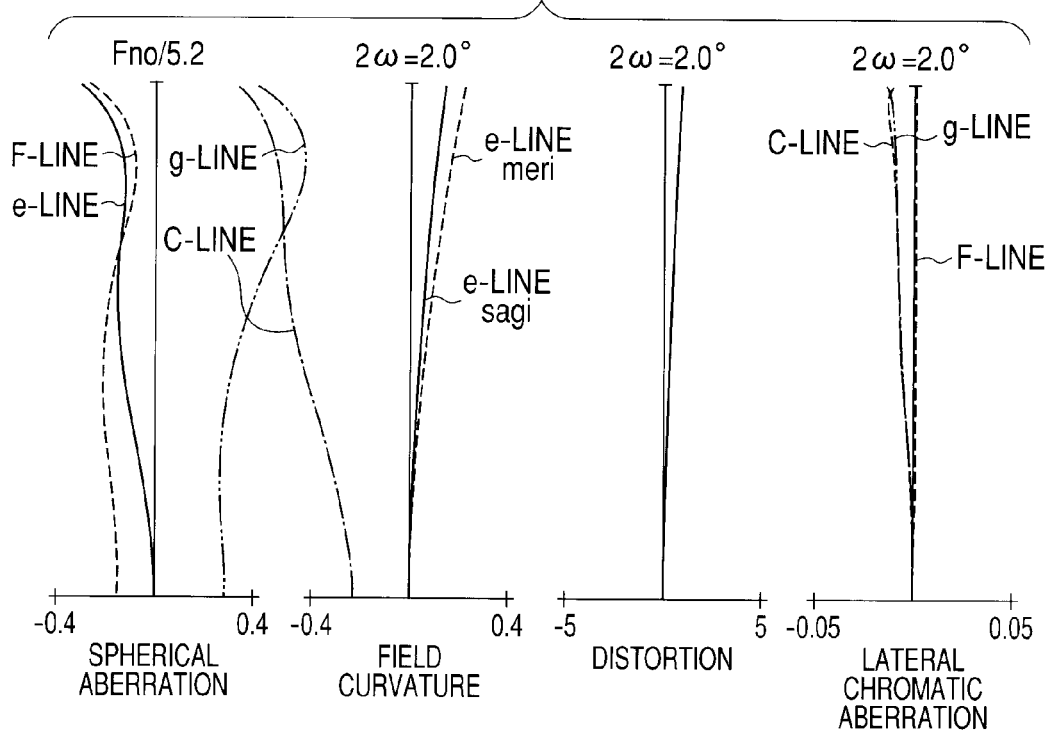
FIG. 14C is a longitudinal aberration graph in Numerical Embodiment 6 when the object distance is 2.5 m at the telephoto end during the magnification-varying optical system insertion state.

FIGS. 14A, 14B, and 14C are longitudinal aberration graphs in Embodiment 6 in focusing cases where the object distance is 2.5 m at the wide angle end, the focal length of 60.9 mm, and the telephoto end, respectively, while the magnification-varying optical system is inserted into the fourth lens unit.

Figure 15:
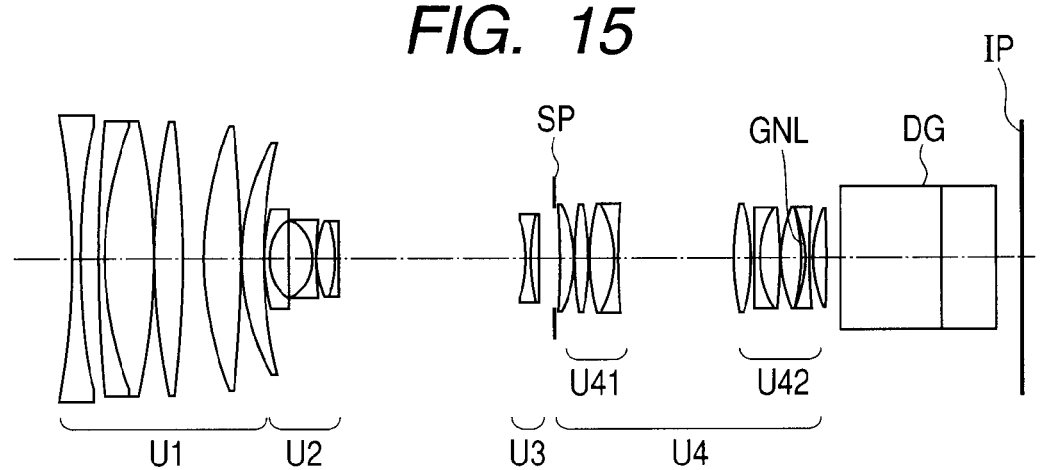
FIG. 15 is a cross sectional view illustrating a zoom lens system according to Embodiment 7 of the present invention in a state of focusing on the infinite-distance object at the wide angle end.
Figure 16A:
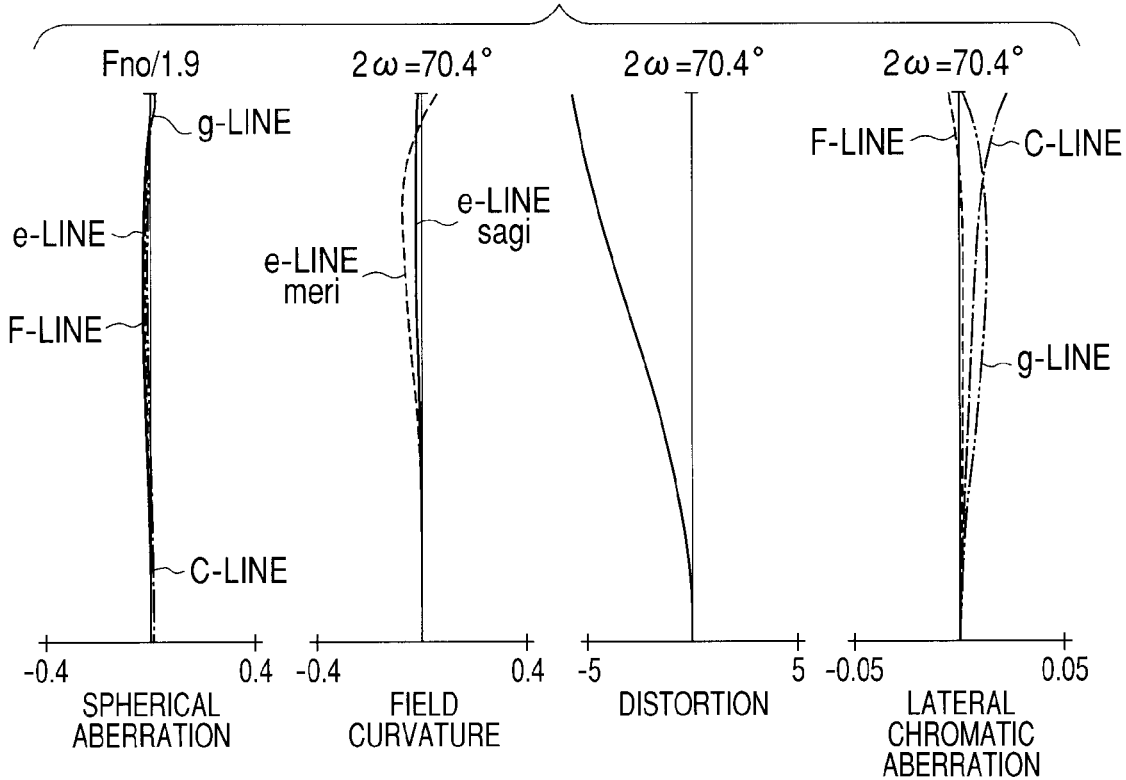
FIG. 16A is a longitudinal aberration graph in Numerical Embodiment 7 of the present invention when the object distance is 2.5 m at the wide angle end.
Figure 16B:
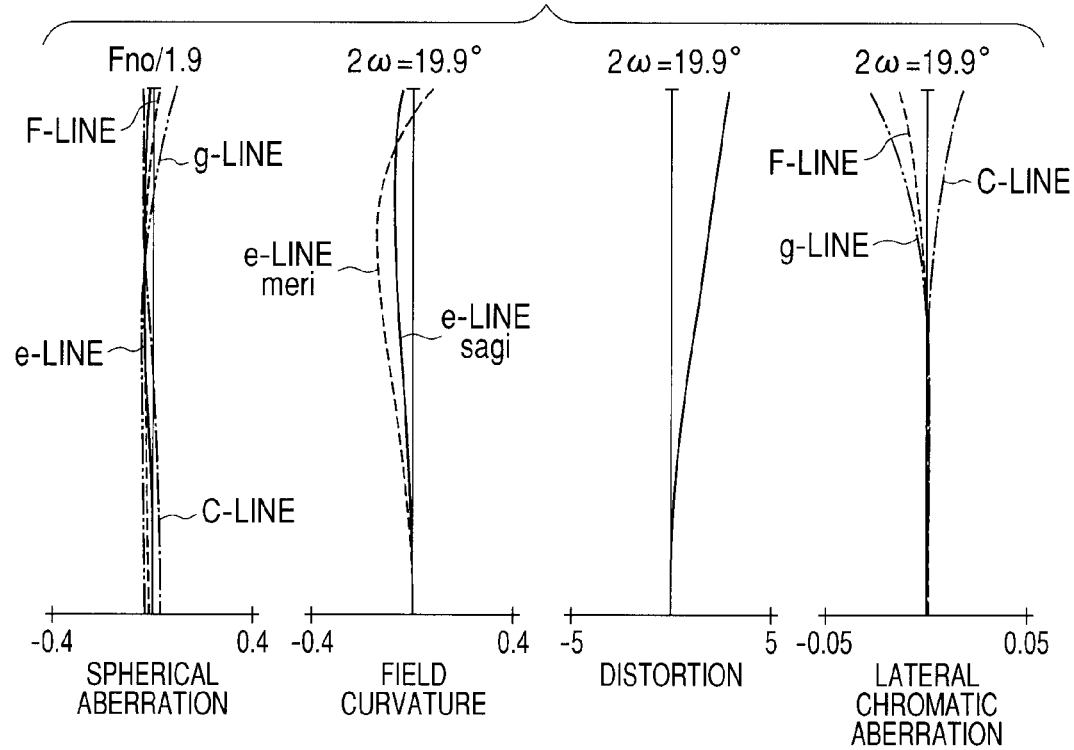
FIG. 16B is a longitudinal aberration graph in Numerical Embodiment 7 when the object distance is 2.5 m at the focal length of 31.67 mm.
Figure 16C:
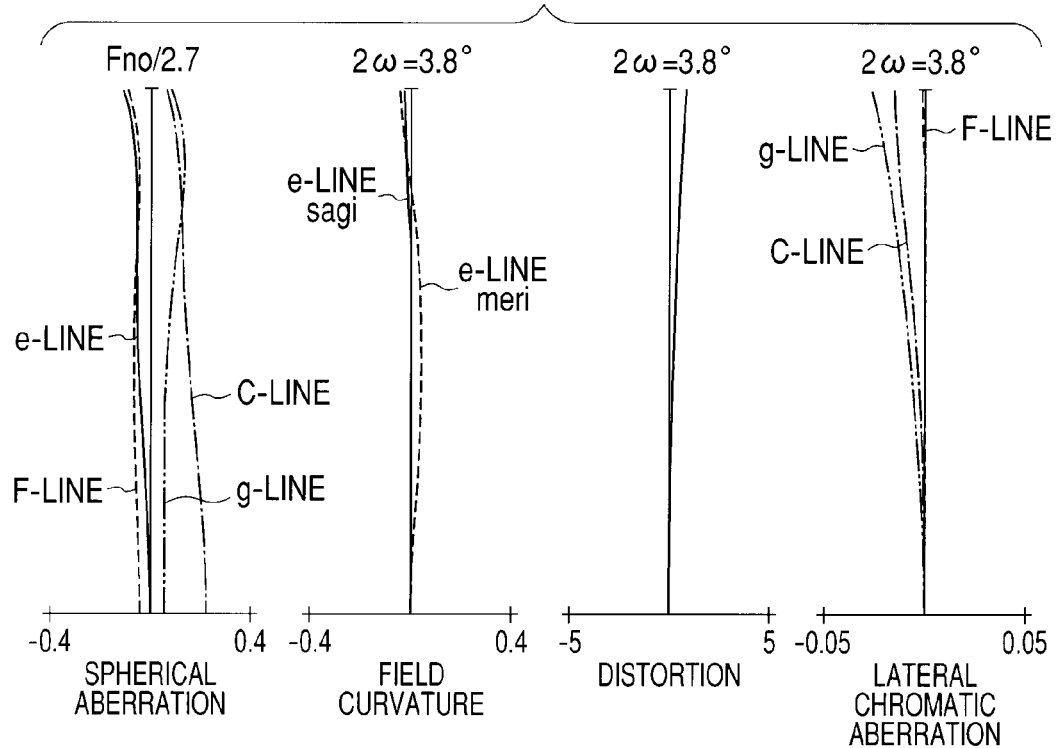
FIG. 16C is a longitudinal aberration graph in Numerical Embodiment 7 when the object distance is 2.5 m at the telephoto end.

FIG. 15 is a lens cross sectional view illustrating in a case where a zoom lens system according to Embodiment 7 (Numerical Embodiment 7) of the present invention is focused on the infinite-distance object at the wide angle end. FIGS. 16A, 16B, and 16C are longitudinal aberration diagrams in Numerical Embodiment 7 in focusing cases where the object distance is 2.5 m at the wide angle end, the focal length of 31.67 mm, and the telephoto end, respectively.

Figure 17:
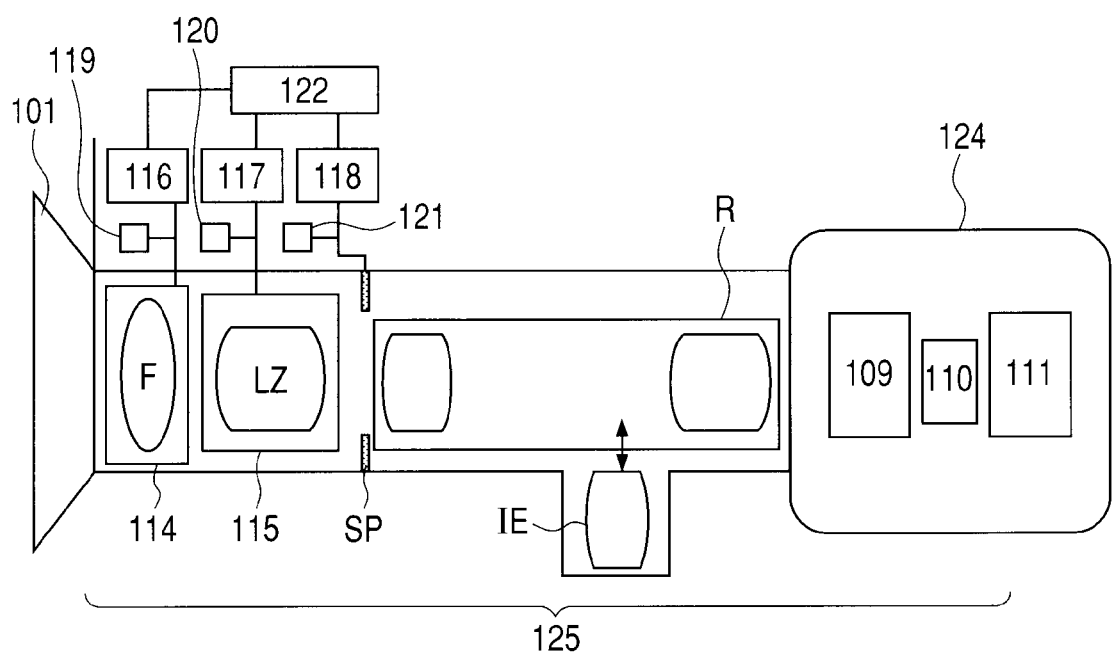
FIG. 17 is a schematic diagram illustrating a main part of an image pickup apparatus according to the present invention.

FIG. 17 is a schematic diagram illustrating an image pickup apparatus according to the present invention.

In the lens cross sectional views, a first lens unit U1 does not move during zooming and has a positive refractive power.

The first lens unit U1 has a refractive power for focusing. The entire lens unit having the refractive power or a part thereof moves for focusing.

A second lens unit (variator lens unit) U2 moves during zooming and has a negative refractive power. A third lens unit (compensator lens unit) U3 moves during zooming and has a negative refractive power.

The third lens unit U3 moves on the optical axis in conjunction with the movement of the second lens unit U2 to correct the image plane variation due to magnification varying.

An aperture stop SP is provided on the image side of the third lens unit U3. A fourth lens unit (relay lens unit) U4 does not move during zooming and has a positive refractive power for imaging.

The fourth lens unit U4 includes a front lens subunit U41 having a positive refractive power and a rear lens subunit U42 having a positive refractive power, which are provided at a maximum air interval.

A magnification-varying optical system EXT is inserted onto and removed from an optical path between the front lens subunit U41 and the rear lens subunit U42 to change a focal length range of the entire system.

A color separation prism or optical filter DG is indicated as a glass block. An image plane IP corresponds to an image pickup surface of a solid-state image pickup element (photo-electric transducer).

Lenses (optical elements) GNL, GNL1, and GNL2 are made of materials (optical materials) having extraordinary dispersion.

In the longitudinal aberration diagrams, spherical aberrations relate to a g-line, an e-line, a C-line, and an F-line. Astigmatisms relate to a meridional image plane (meri) for the e-line and a sagittal image plane (sagi) for the e-line. Lateral chromatic aberrations relate to the g-line, the C-line, and the F-line. An F-number is indicated by Fno and a half field angle is indicated by ω.

In all of the longitudinal aberration diagrams, spherical aberration curves are drawn at a scale of 0.4 mm, astigmatism curves are drawn at a scale of 0.4 mm, distortion curves are drawn at a scale of 5%, and lateral chromatic aberration curves are drawn at a scale of 0.05 mm.

In the following respective embodiments, the wide angle end and the telephoto end correspond to zoom positions in cases where the second lens unit U2 for varying magnification is located in each of both ends of a range in which the second lens unit is movable on the optical axis in view of mechanisms.

Next, features of the respective embodiments are described.

The rear lens subunit U42 includes the lens GNL made of a material having a characteristic satisfying the following conditional expressions, $$-2.100\times10^{-3}\times vd+0.693<\theta gF \quad (1)$$

$$0.555<\theta gF<0.900 \quad (2)$$

where vd indicates an Abbe number of the material and θgF indicates a partial dispersion ratio with respect to the g-line (435.8 nm) and the F-line (486.1 nm) of Fraunhofer lines of the material.

Assume that an average value of an Abbe number and an average value of a partial dispersion ratio of a material of a positive lens included in the front lens subunit U41 are denoted by vfp and θfp, respectively.

Assume that an average value of an Abbe number and an average value of a partial dispersion ratio of a material of a negative lens included in the front lens subunit U41 are denoted by vfn and θfn, respectively.

Assume that an average value of an Abbe number and an average value of a partial dispersion ratio of a material of a positive lens included in the rear lens subunit U42 are denoted by vrp and θrp, respectively.

Assume that an average value of an Abbe number and an average value of a partial dispersion ratio of a material of a negative lens included in the rear lens subunit U42 are denoted by vrn and θrn, respectively.

In this case, the following is satisfied.

$$0.8<(vfp/vfn)/(vrp/vrn)<4.0 \quad (3)$$

$$0.8<|\{(\theta fn-\theta fp)/(vfp-vfn)\}/\{(\theta rn-\theta rp)/(vrp-vrn)\}| \quad (4)$$

The partial dispersion ratios and the Abbe numbers of the materials of the optical elements (lenses) used in the embodiments are as follows.

Assume that refractive indexes with respect to the g-line (435.8 nm), the F-line (486.1 nm), the d-line (587.6 nm), and the C-line (656.3 nm) of Fraunhofer lines are denoted by Ng, NF, Nd, and NC.

The Abbe number vd and the partial dispersion ratio θgF with respect to the g-line and the F-line are defined as follows.

$$vd=(Nd-1)/(NF-NC)$$

$$\theta gF=(Ng-NF)/(NF-NC)$$

In the respective embodiments, the lens structure of the front lens subunit U41 and the lens structure of the rear lens subunit U42 are provided to satisfy Conditional Expressions (1) to (4) described above, so that chromatic aberrations are effectively corrected.

Conditional Expressions (1) to (4) are used to reduce the lateral chromatic aberration on the wide angle side which is increased by an increased field angle of the entire lens system and simultaneously to excellently maintain an axial chromatic aberration over the entire zoom range. To be specific, the optical characteristics of the optical materials having extraordinary dispersion, the achromatic characteristic of the front lens subunit U41 having the positive refractive power, and the achromatic characteristic of the rear lens subunit U42 having the positive refractive power are defined.

When the optical material satisfying Conditional Expressions (1) and (2) is used for a refractive optical element (lens) of the rear lens subunit U42 of the zoom lens system, the chromatic aberrations are excellently corrected over a wide wavelength range between the g-line and the C-line.

When the Abbe number vd and the partial dispersion ratio θgF as described above are used, the degree of chromatic aberration correction of the lens unit may be represented.

In general, it is advantageous to use glass materials having separate Abbe numbers for a positive lens and a negative lens which are included in an achromatic lens unit.

To be specific, when a positive lens made of a material having a large Abbe number (small dispersion) and a negative lens made of a material having a small Abbe number (large dispersion) are combined to each other for an achromatic lens unit having a positive refractive power, an excellent chromatic aberration correction may be achieved.

Therefore, in order to represent the degree of chromatic aberration correction of the lens unit, there is a case where a ratio between the Abbe number of the material of the positive lens and the Abbe number of the material of the negative lens is employed.

In the present invention, the Abbe number ratio is suitably set as expressed in Conditional Expressions (1) and (2) to excellently correct the chromatic aberrations.

Conditional Expression (3) specifies a suitable balance of chromatic aberration correction between two wavelengths different from a reference wavelength (so-called primary chromatic aberration correction) in the front lens subunit U41 having the positive refractive power and the rear lens subunit U42 having the positive refractive power.

When the condition of Conditional Expression (3) exceeds the upper limit value thereof, it is difficult to provide the rear lens subunit U42 having the positive refractive power with a sufficient achromatic effect. In particular, it is difficult to obtain a sufficient lateral chromatic aberration correction effect on the entire optical system.

In contrast to this, when the condition of Conditional Expression (3) falls below the lower limit value thereof, it is difficult to provide the front lens subunit U41 having the positive refractive power with a sufficient achromatic effect. In particular, it is difficult to obtain a sufficient axial chromatic aberration correction effect on the entire optical system.

Conditional Expression (4) specifies a suitable balance of chromatic aberration correction between three wavelengths different from a reference wavelength (so-called secondary chromatic aberration correction) in the front lens subunit U41 having the positive refractive power and the rear lens subunit U42 having the positive refractive power.

When the condition of Conditional Expression (4) falls below the lower limit value thereof, it is difficult to provide the rear lens subunit U42 having the positive refractive power with a sufficient achromatic effect with respect to the front lens subunit U41 having the positive refractive power. In particular, it is difficult to obtain a sufficient lateral chromatic aberration correction effect on the wide angle end of the entire optical system.

In order to avoid the aberration correction and the difficulty of manufacturing, optical materials satisfying Conditional Expressions (1) and (2) may be easily used separately for multiple elements provided in the rear lens subunit U42. Even in such a case, the same effect as described in this specification may be obtained. In this case, an average Abbe number and average partial dispersion ratio of the rear lens subunit U42 are desirably calculated based on optical characteristic values of an optical material having a maximum partial dispersion value, of optical materials satisfying Conditional Expressions (1) and (2). The multiple elements satisfying Conditional Expressions (1) and (2) are desirably collectively assumed as a single element.

The upper limit value of Conditional Expression (4) is not necessarily determined because a large value indicates that the achromatic effect of the rear lens subunit U42 is strong. However, it is not desirable to frequently use an extraordinary dispersion material having the strong achromatic effect because a cost becomes higher or the axial chromatic aberration is overcorrected. When this is taken into account, the upper limit value of Conditional Expression (4) is desirably set to 32.0.

In each of the embodiments, the following conditional expression is satisfied, $$1.8 < fGNL/f42 < 6.5 \quad (5),$$

where fGNL represents a focal length of a lens GNL included in the rear lens subunit U42 and made of a material which satisfies the conditional expressions (1) and (2) and f42 represents a focal length of the rear lens subunit U42.

Further, the following condition is satisfied, $$1.5 < fGNL/f4 < 5.5 \quad (6),$$

where f4 represents a focal length of the fourth lens unit U4.

In the embodiments 5 and 6, the conditional expressions (5) and (6) are applied to the lens configuration in the equi-magnification condition. In particular in case of the embodiment 6, the focal length fGNL2 of the lens GNL2 included in the rear lens subunit U42 is substituted to fGNL in the conditional expressions (5) and (6).

In the conditional expression (5), an appropriate balance between the focal length of the lens GNL and the focal length of the rear lens subunit U42 is defined.

If fGNL/f42 is equal to or larger than the upper limit of the conditional expression (5), the refractive index of the lens GNL is weak relative to the rear lens subunit U42, so that it becomes difficult to provide a sufficient achromatic feature to the lens GNL, in particular, to obtain a sufficient correction feature with respect to the lateral chromatic aberration in the whole optical system.

If fGNL/f42 is equal to or smaller than the lower limit of the conditional expression (5), the refractive index of the lens GNL is strong relative to the rear lens subunit U42, so that the achromatic aberration is likely to be overcorrected and it becomes difficult to obtain an appropriate balance between the axial chromatic aberration and the lateral chromatic aberration in the whole optical system.

In the conditional expression (6), an appropriate balance between the focal length of the lens GNL and the focal length of the fourth lens unit U4 is defined.

If fGNL/f4 is equal to or larger than the upper limit of the conditional expression (6), the refractive index of the lens GNL is weak relative to the fourth lens unit U4, so that it becomes difficult to provide a sufficient achromatic feature to the lens GNL, in particular, to obtain a sufficient correction feature with respect to the lateral chromatic aberration in the whole optical system.

If fGNL/f4 is equal to or smaller than the lower limit of the conditional expression (6), the refractive index of the lens GNL is strong relative to the fourth lens unit U4, so that the achromatic aberration is likely to be overcorrected and it becomes difficult to obtain an appropriate balance between the axial chromatic aberration and the lateral chromatic aberration in the whole optical system.

In Embodiments 5 and 6, the fourth lens unit U4 includes the magnification-varying optical system EXT which may be inserted onto and removed from the optical path between the front lens subunit U41 and the rear lens subunit U42.

When a beam diameter of an on-axial beam incident on a first lens surface of the magnification-varying optical system EXT is denoted by h_k and a beam diameter of an on-axial beam emerged from a final lens surface of the magnification-varying optical system EXT is denoted by h_k_1, the following condition is satisfied.

$$0.7 < h\_k/h\_k\_1 < 2.5 \quad (7)$$

The magnification-varying optical system EXT includes a lens made of an optical material having a characteristic satisfying Conditional Expressions (1) and (2) described above.

When the condition of Conditional Expression (7) exceeds the upper limit value thereof, the focal length of the lens system is shifted toward the telephoto side to significantly lower a height of a light beam passing through the rear lens subunit U42, and hence a height of a light beam passing through a lens having extraordinary dispersion becomes lower. Therefore, a sufficient correction effect is not obtained. This is not desirable.

When the condition of Conditional Expression (7) falls below the lower limit value thereof, the focal length of the lens system is shifted toward the wide angle side to significantly increase the height of the light beam passing through the rear lens subunit U42, and hence the lens diameter becomes larger. Therefore, it is difficult to make the lens system compact. This is not desirable.

The numerical ranges of Conditional Expressions (2) to (7) are more desirably set as follows.

$$0.6 < \theta gF < 0.8 \quad (2a)$$

$$0.9 < (\nu fp/\nu fn)/(\nu rp/\nu rn) < 3.5 \quad (3a)$$

$$1.0 < |\{(\theta fn - \theta fp)/(\nu fp - \nu fn)\}/\{(\theta rn - \theta rp)/(\nu rp - \nu rn)\}| < 13.0 \quad (4a)$$

$$2.0 < fGNL/f42 < 6.0 \quad (5a)$$

$$1.8 < fGNL/f4 < 5.2 \quad (6a)$$

$$0.8 < h\_k/h\_k\_1 < 2.2 \quad (7a)$$

Note that it is apparent that values in the conditional expressions (5) and (6) change if the magnification-varying optical system EXT is inserted.

For instance, when the magnification-varying optical system EXT has a feature to double the focal length, the f4 in the conditional expression (6) theoretically changes to ¼.4 in comparison to a case of equimagnification.

If the magnification-varying optical system EXT includes a lens GNL1 made of material satisfying the conditional expressions (1) and (2) to correct the chromatic aberration, the lens GNL1 takes a function to overcorrect a chromatic aberration in a region where the chromatic aberration is insufficiently corrected in view of the achromatic feature in the equi-magnification condition. Further, since the aberration, among various aberrations, need to be specifically corrected or considered is different between in a case of equi-magnification and in a case of magnification, it is preferable to ensure a sufficiently wide range of refractive power which the lens GNL1 can have.

The following conditional expression is preferably satisfied, $$1.1 < fGNL1/f42 < 9.5 \qquad (5b), \text{ and}$$

$$1.0 < fGNL/f4e < 9.0 \qquad (6b),$$

where f4e represents a focal length of the fourth lens unit U4 with the magnification-varying optical system EXT inserted in the embodiments 5 and 6 and fGNL1 represents a focal length of a lens GNL1 included in the magnification-varying optical system EXT in the embodiment 6.

The rear lens subunit U42 of the zoom lens system according to each of the embodiments includes the lens (refractive optical element GNL) made of the material (optical material) having strong (large) extraordinary dispersion. Thereby, the chromatic aberrations of the entire optical system are suitably balanced.

Note that the refractive optical element is a lens having a power for a refractive action, for example, a refractive lens, and thus does not include a diffraction optical element having power for a diffraction action. The optical material is solid in a state in which the optical system is used, but may have any phase in a state before the optical system is used, such as a manufacturing state. For example, a solid material obtained by hardening a material which is liquid during manufacturing may be used.

In each of the embodiments, the front lens subunit U41 has a four-lens structure including a cemented lens. The number of lenses of the front lens subunit U41 tends to be increased in a case where the front lens subunit U41 is to be provided with the strong achromatic function, but the front lens subunit U41 is realized with the compact lens structure.

In the so-called four-unit zoom lens system including the lens units having the positive, negative, negative, and positive refractive powers, according to each of the embodiments, a light beam is emerged from the third lens unit U3 at a divergent angle, and hence the front lens subunit U41 has the lens structure with the positive refractive power. The front lens subunit U41 generally includes approximately two to six lenses.

When the demand for a compact lens is taken into account, the front lens subunit U41 desirably includes approximately two to four lenses.

In order to excellently correct the chromatic aberrations of the lens unit, at least one set of lenses having positive and negative refractive powers are desirably provided close to each other in the front lens subunit U41.

The case where the positive lens and the negative lens are provided close to each other is divided into a case where the lenses serve as a cemented lens and a case where the lenses are not cemented to each other. In any of the cases, the same achromatic effect may be provided.

In the embodiments, a lens (optical element) made of an optical material such as an organic material or a resin is desirably provided with a lens function having a refractive power.

In the zoom lens system according to each of the embodiments, the lens made of the optical material having extraordinary dispersion is provided in the rear lens subunit U42 to most effectively correct, particularly the lateral chromatic aberration. When the paraxial disposition of the lens is analyzed, the effective disposition of the optical material may be determined. Principal analysis references are a ratio between an optical path height of an on-axial beam and an optical path height of an off-axial beam with respect to the optical axis in the lens and a refractive power of the optical material which may be provided in a case where the lens diameter is taken into account.

In the type of the zoom lens system according to each of the embodiments, when the lens GNL is provided closest or close to the image plane in the lens unit, the lateral chromatic aberration is most effectively corrected.

Assume that h_bar indicates a height with respect to the optical axis, at which the off-axial beam passes through the lens GNL in a case of paraxial tracing and h indicates a height with respect to the optical axis, at which the on-axial beam passes through the lens GNL in a case of paraxial tracing.

In this case, the ratio between the optical path height of the on-axial beam and the optical path height of the off-axial beam with respect to the optical axis is desirably as follows.

$$0.05 < h\_bar/h < 1.50 \qquad (8)$$

When the condition of Conditional Expression (8) falls below the lower limit value thereof, the influence of the lens GNL on the off-axial beam is small, and hence it is difficult to effectively correct the lateral chromatic aberration.

In contrast, when the condition of Conditional Expression (8) exceeds the upper limit value thereof, component of the on-axial beam becomes too small. Even in this case, it is difficult to effectively correct the lateral chromatic aberration.

The numerical range of Conditional Expression (8) is more desirably set as follows.

$$0.1 < h\_bar/h < 0.5 \qquad (8a)$$

Assume that h_i indicates a height with respect to the optical axis, at which an on-axial beam passes through an i-th thin lens in a case of paraxial tracing. Assume that h_bar_i indicates a height with respect to the optical axis, at which an off-axial beam passes through the i-th thin lens in a case of paraxial tracing. Assume that φ_i indicates a power of the i-th thin lens in the case of paraxial tracing. Assume that vi indicates an Abbe number of the i-th thin lens in the case of paraxial tracing.

In this case, a lateral chromatic aberration coefficient T of the lens system is expressed as follows.

$$T = \Sigma(h\_i \times h\_bar\_i \times \varphi\_i/v\_i) \qquad (9)$$

The lateral chromatic aberration coefficient T is proportional to the heights h and h_bar.

As a result obtained by the analysis described above, when the lens made of the optical material is provided in the rear lens subunit U42 of the zoom lens system according to each of the embodiments including the examples described in Numerical Embodiments 1 to 6 corresponding to Embodiments 1 to 6 and other similar examples, the chromatic aberration correction effect may be efficiently obtained.

The zoom lens system according to each of the embodiments is of the zoom type in which a magnification-varying ratio of approximately 10 to 40 is achieved, the lens structure is relatively simple, and the excellent aberration correction may be achieved over the entire zoom range.

When the fourth lens unit U4 having the positive refractive power is constructed as described above, performances for correcting the axial chromatic aberration and the lateral chromatic aberration by the front lens subunit U41 having the positive refractive power and the rear lens subunit U42 having the positive refractive power are effectively dispersed.

In general, when an air interval having a suitable length is provided between the front lens subunit U41 having the positive refractive power and the rear lens subunit U42 having the positive refractive power, the ratio between the optical path heights with respect to the optical axis, of the on-axial beam and the off-axial beam which pass through each of the lens units is changed.

Therefore, the performances for correcting the axial chromatic aberration and the lateral chromatic aberration may be shared.

Assume that D indicates an air interval between the front lens subunit U41 and the rear lens subunit U42 in the fourth lens unit U4. Assume that L4 indicates a length between a first lens surface and a final lens surface of the fourth lens unit U4. Assume that $\theta$ indicates an oblique angle [unit: degree)(°)] between the optical axis and an on-axial beam passing through the air interval between the front lens subunit U41 and the rear lens subunit U42 in the fourth lens unit U4.

Here, assume that an angle of a converged light beam with respect to the optical axis is expressed as "+" and an angle of a diverged light beam with respect to the optical axis is expressed as "−", and $\theta=0$ in an afocal state.

In this case, the air interval is set so as to satisfy at least one of the following conditions.

$$L4/8<D \tag{10}$$

$$-5°<\theta<+5° \tag{11}$$

When a movable portion (movable lens unit) for mainly magnification-varying is provided in the fourth lens unit U4 having the positive refractive power, an effective diameter of the entire lens system increases, and hence manufacturing the lens system becomes difficult.

The fourth lens unit U4 includes a lens unit of which flange back sensitivity is high. Therefore, a flange back adjusting unit or a micromechanism is provided in the fourth lens unit U4.

Conditional Expression (10) is desirably set as follows.

$$L4/8<D<L4/1.5 \tag{10a}$$

Conditional Expressions (10) and (11) are more desirably set as follows.

$$L4/6<D<L4/2 \tag{10b}$$

$$-3.5°<\theta<+3.5° \tag{11a}$$

The lens (refractive optical element) made of the optical material satisfying Conditional Expressions (1) and (2) is used for the rear lens subunit U42, and hence the chromatic aberrations are excellently corrected over the wide wavelength band between the g-line and the C-line.

When Conditional Expressions (1) and (2) are not satisfied, it is difficult to correct the chromatic aberrations of the optical system, which is not desirable. For example, when a lens made of a material significantly different from a normal optical material is used, another lens made of the normal optical material is required to have a very large power in order to cancel a large effect of the lens made of the material significantly different from the normal optical material.

As a result, in particular, a spherical aberration, coma, or astigmatism increases, and hence it is difficult to perform balanced control using the normal optical material.

In other words, it is important that the optical material with extraordinary dispersion, which is used in each of the embodiments, has a partial dispersion ratio which is larger than that of the normal optical material and is not significantly different from a partial dispersion ratio of the normal optical material.

Conditional Expressions (1) and (2) represent a relationship between the Abbe number νd and the partial dispersion ratio θgF to excellently correct the chromatic aberrations in view of the relationships described above.

When a partial dispersion ratio of the optical material with respect to the g-line (435.8 nm) and the d-line (587.6 nm) of Fraunhofer lines satisfying Conditional Expressions (1) and (2) is expressed by θgd, it is more desirable to satisfy Conditional Expressions (12) and (13) as follows.

$$-2.407\times10^{-3}\times vd+1.420<\theta gd \tag{12}$$

$$1.255<\theta gd<1.670 \tag{13}$$

When Conditional Expressions (12) and (13) are satisfied simultaneously in addition to Conditional Expressions (1) and (2), it is easy to perform an excellent chromatic aberration correction between the g-line and the d-line. Therefore, a more excellent chromatic aberration correction is easily performed in the wavelength band between the g-line and the C-line.

The partial dispersion ratio θgd with respect to the g-line and the d-line is expressed as follows.

$$\theta gd=(Ng-Nd)/(NF-NC)$$

Next, the features of the lens structures in the respective embodiments are described.

Embodiment 1

In Numerical Embodiment 1 corresponding to Embodiment 1, an optical material (1) illustrated in Table 1 is used for the optical element (lens GNL).

In Numerical Embodiment 1 corresponding to Embodiment 1, substituting an Abbe number value and a partial dispersion ratio value into Conditional Expressions (1) to (13) yields values described in an "Embodiment 1" column of Table 2, and hence all the conditional expressions are satisfied. Therefore, Numerical Embodiment 1 achieves an excellent lateral chromatic aberration at the wide angle end and an excellent axial chromatic aberration over the entire zoom range.

The lens GNL made of the optical material having the extraordinary dispersion in Numerical Embodiment 1 is provided as the sixth positive lens counted from the object side in the rear lens subunit U42 and cemented to a seventh positive lens of the rear lens subunit U42. The lens GNL is provided as a positive lens of the rear lens subunit U42 and located close to the image plane, and hence the lateral chromatic aberration is effectively corrected particularly on the wide angle side.

The front lens subunit U41 includes a positive lens of which an image side surface is convex, a biconvex positive lens, and a cemented lens having a biconvex positive lens and a negative lens.

The rear lens subunit U42 includes a positive lens, a cemented lens having a negative lens and a positive lens, a cemented lens having a positive lens and a negative lens, and a cemented lens having two positive lenses.

Embodiment 2

The optical material (1) illustrated in Table 1 is used for the lens (optical element) GNL made of the optical material having the extraordinary dispersion.

In Numerical Embodiment 2 corresponding to Embodiment 2, substituting an Abbe number value and a partial dispersion ratio value into Conditional Expressions (1) to (13) yields values described in an "Embodiment 2" column of Table 2, and hence all the conditional expressions are satisfied. Therefore, Numerical Embodiment 2 achieves an excellent lateral chromatic aberration at the wide angle end and an excellent axial chromatic aberration over the entire zoom range.

In Numerical Embodiment 2, the front lens subunit U41 has a four-lens structure including a cemented lens. It is more likely to increase the number of lenses of the front lens subunit U41 in a case where the front lens subunit U41 is to be provided with a strong achromatic function, but the front lens subunit U41 is realized with the compact lens structure.

The lens GNL made of the optical material having the extraordinary dispersion in Numerical Embodiment 2 is provided as the fifth positive lens counted from the object side in the rear lens subunit U42 and cemented to a sixth negative lens of the rear lens subunit U42. The fifth positive lens of the rear lens subunit U42 is provided, and hence the lateral chromatic aberration is effectively corrected particularly on the wide angle side.

The front lens subunit U41 has the same lens structure as that in Embodiment 1.

The rear lens subunit U42 includes a positive lens, a cemented lens having a negative lens and a positive lens, a positive lens, a cemented lens having a positive lens and a negative lens, and a positive lens.

Embodiment 3

The optical material (1) illustrated in Table 1 is used for the lens (optical element) GNL made of the optical material having the extraordinary dispersion.

In Numerical Embodiment 3 corresponding to Embodiment 3, substituting an Abbe number value and partial dispersion ratio value into Conditional Expressions (1) to (13) yields values described in an "Embodiment 3" column of Table 2, and hence all the conditional expressions are satisfied. Therefore, Numerical Embodiment 3 achieves an excellent lateral chromatic aberration at the wide angle end and an excellent axial chromatic aberration over the entire zoom range.

In Numerical Embodiment 3, the front lens subunit U41 has a four-lens structure not including a cemented lens. It is more likely to increase the number of lenses of the front lens subunit U41 in a case where the front lens subunit U41 is to be provided with a strong achromatic function, but the front lens subunit U41 is realized with the compact lens structure.

The lens GNL made of the optical material having the extraordinary dispersion in Numerical Embodiment 3 is provided as the fifth positive lens counted from the object side in the rear lens subunit U42 and cemented to a sixth negative lens of the rear lens subunit U42. The fifth positive lens of the rear lens subunit U42 is provided, and hence the lateral chromatic aberration is effectively corrected particularly on the wide angle side.

The front lens subunit U41 includes a positive lens, a positive lens, a positive lens, and a negative lens. The rear lens subunit U42 has the same lens structure as that of Embodiment 2.

Embodiment 4

An optical material (2) illustrated in Table 1 is used for the lens (optical element) GNL made of the optical material having the extraordinary dispersion.

In Numerical Embodiment 4 corresponding to Embodiment 4, substituting an Abbe number value and a partial dispersion ratio value into Conditional Expressions (1) to (13) yields values described in an "Embodiment 4" column of Table 2, and hence all the conditional expressions are satisfied.

Therefore, Numerical Embodiment 4 achieves an excellent lateral chromatic aberration at the wide angle end and an excellent axial chromatic aberration over the entire zoom range.

In Numerical Embodiment 4, the front lens subunit U41 has a four-lens structure not including a cemented lens. It is more likely to increase the number of lenses of the front lens subunit U41 in a case where the front lens subunit U41 is to be provided with a strong achromatic function, but the front lens subunit U41 is realized with the compact lens structure.

The lens GNL made of the optical material having the extraordinary dispersion in Numerical Embodiment 4 is provided as the third positive lens counted from the object side in the rear lens subunit U42 and cemented to a second negative lens and a fourth positive lens of the rear lens subunit U42. The third positive lens of the rear lens subunit U42 is provided, and hence the lateral chromatic aberration is effectively corrected particularly on the wide angle side.

The front lens subunit U41 has the same lens structure as that of Embodiment 3.

The rear lens subunit U42 includes a positive lens, a cemented lens having a negative lens, a positive lens, and a positive lens, a cemented lens having a positive lens and a negative lens, and a positive lens.

Embodiment 5

The optical material (1) illustrated in Table 1 is used for the lens (optical element) GNL made of the optical material having the extraordinary dispersion. The magnification-varying optical system (extender) EXT may be inserted or removed.

In Numerical Embodiment 5 corresponding to Embodiment 5, substituting an Abbe number value and a partial dispersion ratio value into Conditional Expressions (1) to (13) yields values described in an "Embodiment 5" column of Table 2, and hence all the conditional expressions are satisfied. Therefore, Numerical Embodiment 5 achieves an excellent lateral chromatic aberration at the wide angle end and an excellent axial chromatic aberration over the entire zoom range.

In Numerical Embodiment 5, the front lens subunit U41 has a four-lens structure including a cemented lens. It is more likely to increase the number of lenses of the front lens subunit U41 in a case where the front lens subunit U41 is to be provided with a strong achromatic function, but the front lens subunit U41 is realized with the compact lens structure.

The lens (optical element) GNL made of the optical material having the extraordinary dispersion in Numerical Embodiment 5 is provided as the sixth positive lens counted from the object side in the rear lens subunit U42 and cemented to a seventh positive lens of the rear lens subunit U42. The sixth positive lens of the rear lens subunit U42 is located close to the image plane, and hence the lateral chromatic aberration is effectively corrected particularly on the wide angle side.

In Numerical Embodiment 5, the magnification-varying optical system EXT may be inserted and removed. The aberrations of the entire lens system are excellently corrected, irrespective of whether the magnification-varying optical system is inserted or removed.

The zoom lens system has the structure in which the magnification-varying optical system is inserted and removed between the front lens subunit U41 and the rear lens subunit U42.

A technique for inserting and removing the magnification-varying optical system is known to change a field angle at the wide angle end or the telephoto end while maintaining a total lens length of a normal zoom lens system.

The zoom lens system according to the present invention also achieves the change of the field angle due to the insertion and removal of the magnification-varying optical system while maintaining excellent optical performance. The setting of the large interval in the fourth lens unit is one of ideas capable of allowing the insertion and removal of the magnification-varying optical system.

When the magnification-varying optical system is inserted, a magnification-varying rate thereof changes an aberration sensitivity balance between the lens unit located in the object side of the magnification-varying optical system and the lens unit located in the image plane side of the magnification-varying optical system.

For example, when the magnification-varying optical system for increasing the focal length of the entire system to approximately two times is inserted, the sensitivity to the axial chromatic aberration of the lens unit located in the object side of the magnification-varying optical system is approximately four times higher than that before the insertion.

Simultaneously, there are changes in optical paths of the on-axial beam and off-axial beam which pass through the rear lens subunit U42 in the case where the magnification-varying optical system is inserted, and hence the influence of the lens made of the optical material having the extraordinary dispersion changes.

Therefore, in an optical system in which the achromatic performances of the respective lens units are not suitably shared, even when the achromatic balance of an optical system is appropriate in the state before the insertion of the magnification-varying optical system, a chromatic aberration balance may be undesirably changed unsuitable when the magnification-varying optical system is inserted.

Thus, in the case of the lens system including the magnification-varying optical system which are inserted and removed, it is important to take into account the chromatic aberration correction balance between the front lens subunit U41 and the rear lens subunit U42 which are high in aberration sensitivity at the wide angle end which is particularly used as an aberration correction reference.

The front lens subunit U41 and the rear lens subunit U42 have the same lens structure as those in Embodiment 1.

Embodiment 6

In FIG. 12, lenses (optical elements) GNL1 and GNL2 are made of optical materials having the extraordinary dispersion. The optical material (2) illustrated in Table 1 is used for the lens GNL1 and the optical material (1) illustrated in Table 1 is used for the lens GNL2. The magnification-varying optical system EXT may be inserted or removed.

In Numerical Embodiment 6 corresponding to Embodiment 6, substituting an Abbe number value and a partial dispersion ratio value into Conditional Expressions (1) to (13) yields values described in an "Embodiment 6" column of Table 2, and hence all the conditional expressions are satisfied. Therefore, Numerical Embodiment 6 achieves an excellent lateral chromatic aberration at the wide angle end and an excellent axial chromatic aberration over the entire zoom range.

In Numerical Embodiment 6, the front lens subunit U41 has a four-lens structure including a cemented lens. It is more likely to increase the number of lenses of the front lens subunit U41 in a case where the front lens subunit U41 is to be provided with a strong achromatic function, but the front lens subunit U41 is realized with the compact lens structure.

The lens GNL1 made of the optical material having the extraordinary dispersion in Numerical Embodiment 6 is provided as the third positive lens counted from the object side the magnification-varying optical system and cemented to a second positive lens and a fourth negative lens of the magnification-varying optical system.

The lens GNL1 is provided, and hence, in particular, the balance between the axial chromatic aberration and the lateral chromatic aberration over the entire zoom range is effectively corrected even in the case where the magnification-varying optical system is inserted.

The lens GNL2 made of the optical material having the extraordinary dispersion in Numerical Embodiment 6 is provided as the sixth positive lens counted from the object side in the rear lens subunit U42 and cemented to a seventh positive lens of the rear lens subunit U42. The lens GNL2 is provided as a positive lens located close to the image plane in the rear lens subunit U42, and hence the lateral chromatic aberration is effectively corrected particularly on the wide angle side.

In Numerical Embodiment 6, the magnification-varying optical system EXT may be inserted and removed. In any of the insertion and removal states, the aberrations of the entire lens system are excellently corrected.

When the beam passing through the lens made of the extraordinary dispersion material is changed because of the insertion of the magnification-varying optical system, chromatic aberration balance inevitably changes between before and after the insertion.

Therefore, the lens made of the extraordinary dispersion material is provided in the magnification-varying optical system to prevent the chromatic aberration correction balance from becoming insufficient or excessive due to the insertion or removal of the magnification-varying optical system.

As compared with a magnification-varying optical system which does not include the lens made of the extraordinary dispersion material, a more excellent chromatic aberration correction is achieved. In any of the insertion and removal states, the aberrations of the entire lens system are excellently corrected.

The front lens subunit U41 and the rear lens subunit U42 have the same lens structure as those in Embodiment 1.

Embodiment 7

The optical material (1) illustrated in Table 1 is used for the lens (optical element) GNL made of the optical material having the extraordinary dispersion.

In Numerical Embodiment 7 corresponding Embodiment 7, substituting an Abbe number value and a partial dispersion ratio value into Conditional Expressions (1) to (13) yields values described in an "Embodiment 7" column of Table 2, and hence all the conditional expressions are satisfied. Therefore, Numerical Embodiment 7 achieves an excellent lateral chromatic aberration at the wide angle end and an excellent axial chromatic aberration over the entire zoom range.

In Numerical Embodiment 7, the front lens subunit U41 has a four-lens structure including a cemented lens. It is more likely to increase the number of lenses of the front lens subunit U41 in a case where the front lens subunit U41 is to be provided with a strong achromatic function, but the front lens subunit U41 is realized with the compact lens structure.

The lens GNL made of the optical material having the extraordinary dispersion in Numerical Embodiment 7 is provided as the fifth positive lens counted from the object side in the rear lens subunit U42 and cemented to a fourth positive lens and a sixth negative lens of the rear lens subunit U42. The fifth positive lens of the rear lens subunit U42 is provided, and hence the lateral chromatic aberration is effectively corrected particularly on the wide angle side.

When the optical material is sandwiched by the lenses as in Numerical Embodiment 7, an effect for reducing deterioration, alternation, or deformation of the optical material in comparison to a case where the optical material is exposed to air is also obtained.

The front lens subunit U41 has the same lens structure as that of Embodiment 1.

The rear lens subunit U42 includes a positive lens, a cemented lens having a negative lens and a positive lens, a cemented lens having a positive lens, a positive lens, and a negative lens, and a positive lens.

When Numerical Embodiment 7 is compared to Numerical Embodiment 2, the position of the optical material (1) from the object side in the rear lens subunit U42 and the value of Conditional Expression (8) are substantially the same. However, in Numerical Embodiment 7, the optical material which has the Abbe number $vd \geq 80$ and the partial dispersion ratio $\theta gF \geq 0.53$, that is, the so-called extraordinary dispersion characteristic is used for the rear lens subunit U42 to have a positive refractive power. Therefore, the chromatic aberration correction of the rear lens subunit U42 is enhanced, and hence the lateral chromatic aberration correction at the wide angle end becomes advantageous. As a result, the refractive power of the optical material (1) in Numerical Embodiment 7 is weaker than the refractive power in Numerical Embodiment 2, but substantially the same aberration correction effect as in Numerical Embodiment 2 is achieved. This is exhibited as a difference with the value of Conditional Expression (4). Note that, when the value of Conditional Expression (4) is excessively large, the problem as described above occurs, and hence it is necessary to suitably adjust the range.

FIG. 17 is a principal schematic diagram illustrating an image pickup apparatus (television camera system) using the zoom lens system according to each of the embodiments as an image pickup optical system. In FIG. 17, a zoom lens system 101 according to any one of Embodiments 1 to 6 and a camera 124 are provided. The zoom lens system 101 is detachably attached to the camera 124. An image pickup apparatus 125 has a structure in which the zoom lens system 101 is attached to the camera 124.

The zoom lens system 101 includes a first lens unit F (U1 in other embodiments), a magnification-varying section LZ (U2 and U3), and a fourth lens unit R (U4) for imaging. The first lens unit F includes a focusing lens unit. The magnification-varying section LZ includes a second lens unit which moves on the optical axis so as to vary the magnification and a third lens unit which moves on the optical axis so as to correct an image plane variation due to magnification-varying.

The zoom lens system 101 includes the aperture stop SP. The fourth lens unit R includes a lens unit (magnification-varying optical system) IE which may be inserted onto or removed from the optical path.

The lens unit IE is provided to shift the focal length range of the entire system of the zoom lens system 101.

Drive mechanisms 114 and 115 such as helicoids or cams drive the first lens unit F and the magnification-varying section LZ, respectively, in the optical axis direction.

Motors (drive units) 116 to 118 are provided to electrically drive the drive mechanisms 114 and 115 and the aperture stop SP.

Detectors 119 to 121 such as encoders, potentiometers, or photosensors detect positions of the first lens unit F and the magnification-varying section LZ on the optical axis and a stop diameter of the aperture stop SP.

The camera 124 includes: a glass block 109 corresponding to an optical filter or a color separation prism; and a solid-state image pickup element (photoelectric transducer) such as a CCD sensor or a CMOS sensor, for receiving a subject image formed by the zoom lens system 101.

CPUs 111 and 122 perform various drive controls of the camera 124 and the main body of the zoom lens system 101, respectively.

When the zoom lens system according to the present invention is applied to the television camera system as described above, the image pickup apparatus having high optical performance is realized.

Hereinafter, Numerical Embodiments 1 to 7 corresponding to Embodiments 1 to 7 of the present invention are described. In the respective numerical embodiments, a surface number is counted from the object side. In addition, ri indicates a curvature radius of an i-th surface counted from the object side and di indicates an interval between the i-th surface and an (i+1)-th surface which are counted from the image side. Further, Ni and vi indicate a refractive index and an Abbe number of an i-th optical material, respectively.

Each of Numerical Embodiments 5 and 6 illustrates both cases where the magnification-varying optical system is inserted onto and removed from the optical path. A mark "*" indicates an aspherical surface.

Last three surfaces correspond to a glass block such as a filter.

Assume that the optical axis direction is an X-axis, a direction perpendicular to the optical axis is an H axis, and a light traveling direction is positive. In this case, when R denotes a paraxial curvature radius, k denotes a conic constant, and A3, A4, A5, A6, A7, A8, A9, A10, A11, and A12 denote aspherical coefficients, an aspherical surface shape is expressed by the following expression.

$$X = \frac{H^2/R}{1 + \sqrt{1-(1+k)(H/R)^2}} + A4H^4 + A6H^6 + A8H^8 + A10H^{10} + A12H^{12} + A3H^3 A5H^5 + A7H^7 + A9H^9 + A11H^{11}$$ ⟨Equation 1⟩

For example, "e-Z" indicates "$\times 10^{-Z}$". The mark "*" indicates the aspherical surface. Table 2 illustrates a correspondence relationship between the respective embodiments and the conditional expressions described above.

Numerical Embodiment 1 surface data

| surface number | r | d | nd | vd |
|---|---|---|---|---|
| 1 | −200.343 | 1.80 | 1.72916 | 54.7 |
| 2 | 204.613 | 5.58 | | |
| 3 | 413.815 | 1.80 | 1.80518 | 25.4 |
| 4 | 101.511 | 14.94 | 1.43875 | 95.0 |
| 5 | −157.163 | 0.15 | | |
| 6 | 176.271 | 8.28 | 1.59240 | 68.3 |
| 7 | −344.706 | 6.77 | | |
| 8 | 105.690 | 10.62 | 1.49700 | 81.5 |
| 9 | −290.842 | 0.15 | | |
| 10 | 67.523 | 6.52 | 1.72916 | 54.7 |
| 11 | 159.426 | (variable) | | |
| 12* | 135.799 | 0.70 | 1.88300 | 40.8 |
| 13 | 14.159 | 6.06 | | |
| 14 | −131.436 | 6.68 | 1.80809 | 22.8 |
| 15 | −13.727 | 0.70 | 1.81600 | 46.6 |
| 16 | 48.936 | 0.16 | | |
| 17 | 23.757 | 5.95 | 1.53172 | 48.8 |
| 18 | −28.902 | 0.26 | | |
| 19 | −26.005 | 0.70 | 1.83481 | 42.7 |
| 20 | −258.788 | (variable) | | |
| 21 | −28.262 | 0.70 | 1.74320 | 49.3 |
| 22 | 46.007 | 2.80 | 1.84666 | 23.8 |
| 23 | −1313.700 | (variable) | | |
| 24 (stop) | ∞ | 1.30 | | |
| 25 | −168.815 | 4.36 | 1.65844 | 50.9 |
| 26 | −30.878 | 0.15 | | |
| 27 | 101.203 | 3.24 | 1.51633 | 64.1 |
| 28 | −121.294 | 0.15 | | |
| 29 | 70.938 | 6.27 | 1.51633 | 64.1 |
| 30 | −37.101 | 1.50 | 1.83400 | 37.2 |
| 31 | −1396.881 | 35.20 | | |
| 32 | 120.820 | 6.56 | 1.51633 | 64.1 |
| 33 | −83.194 | 0.23 | | |
| 34 | 390.576 | 1.00 | 1.83400 | 37.2 |
| 35 | 25.355 | 7.55 | 1.51742 | 52.4 |
| 36 | −96.499 | 0.40 | | |
| 37 | 54.181 | 9.07 | 1.48749 | 70.2 |
| 38 | −27.626 | 1.00 | 1.83400 | 37.2 |
| 39 | 5005.986 | 0.15 | | |
| 40 | 637.710 | 2.10 | 1.63555 | 22.7 |
| 41 | −138.984 | 5.00 | 1.51823 | 58.9 |
| 42 | −31.247 | 4.50 | | |
| 43 | ∞ | 30.00 | | |
| 44 | ∞ | 16.20 | 1.51633 | 64.2 |
| 45 | ∞ | (variable) | | | aspherical surface data
twelfth surface

K = 8.58860e+000   A4 = 8.72570e−006   A6 = −1.90211e−008
A8 = 9.49066e−011   A10 = −9.79700e−013   A12 = 7.34817e−015
A3 = −9.99333e−007   A5 = −5.91697e−008   A7 = −4.82122e−010
A9 = 2.01841e−011   A11 = −1.38838e−013 various data
zoom ratio 21.00

| | wide angle | intermediate | telephoto |
|---|---|---|---|
| focal length | 7.80 | 31.67 | 163.80 |
| f-number | 1.80 | 1.80 | 2.69 |
| field angle | 35.19 | 9.85 | 1.92 |
| image height | 5.50 | 5.50 | 5.50 |
| entire length of lenses | 269.14 | 269.14 | 269.14 |
| BF | 41.34 | 41.34 | 41.34 |
| d11 | 0.67 | 36.75 | 53.43 |
| d20 | 55.71 | 14.03 | 6.07 |
| d23 | 4.85 | 10.45 | 1.73 |
| d45 | 7.50 | 7.50 | 7.50 | zoom lens unit data

| unit | start surface | focal length | lens length | front principal point position | rear principal point position |
|---|---|---|---|---|---|
| 1 | 1 | 68.20 | 56.61 | 36.63 | 2.84 |
| 2 | 10 | −13.40 | 21.23 | 2.17 | −11.59 |
| 3 | 21 | −42.80 | 3.50 | −0.09 | −2.01 |
| 4 | 24 | 63.70 | 135.94 | 74.52 | −144.37 |

Numerical Embodiment 2 surface data

| surface number | r | d | nd | vd |
|---|---|---|---|---|
| 1 | −200.343 | 1.80 | 1.72916 | 54.7 |
| 2 | 204.613 | 5.58 | | |
| 3 | 413.815 | 1.80 | 1.80518 | 25.4 |
| 4 | 101.511 | 14.94 | 1.43875 | 95.0 |
| 5 | −157.163 | 0.15 | | |
| 6 | 176.271 | 8.28 | 1.59240 | 68.3 |
| 7 | −344.706 | 6.77 | | |
| 8 | 105.690 | 10.62 | 1.49700 | 81.5 |
| 9 | −290.842 | 0.15 | | |
| 10 | 67.523 | 6.52 | 1.72916 | 54.7 |
| 11 | 159.426 | (variable) | | |
| 12* | 135.799 | 0.70 | 1.88300 | 40.8 |
| 13 | 14.159 | 6.06 | | |
| 14 | −131.436 | 6.68 | 1.80809 | 22.8 |
| 15 | −13.727 | 0.70 | 1.81600 | 46.6 |
| 16 | 48.936 | 0.16 | | |
| 17 | 23.757 | 5.95 | 1.53172 | 48.8 |
| 18 | −28.902 | 0.26 | | |
| 19 | −26.005 | 0.70 | 1.83481 | 42.7 |
| 20 | −258.788 | (variable) | | |
| 21 | −28.262 | 0.70 | 1.74320 | 49.3 |
| 22 | 46.007 | 2.80 | 1.84666 | 23.8 |
| 23 | −1313.700 | (variable) | | |
| 24 (stop) | ∞ | 1.30 | | |
| 25 | −77.567 | 4.36 | 1.65844 | 50.9 |
| 26 | −36.724 | 0.15 | | |
| 27 | 223.905 | 3.24 | 1.53172 | 48.8 |
| 28 | −77.122 | 0.15 | | |
| 29 | 53.023 | 6.27 | 1.48749 | 70.2 |
| 30 | −85.875 | 1.50 | 1.84666 | 23.8 |
| 31 | −302.387 | 35.20 | | |
| 32 | 39.634 | 5.26 | 1.48749 | 70.2 |
| 33 | 339.479 | 1.03 | | |
| 34 | −191.869 | 1.00 | 1.83400 | 37.2 |
| 35 | 23.823 | 7.55 | 1.50127 | 56.5 |
| 36 | −48.477 | 0.40 | | |
| 37 | 58.386 | 6.07 | 1.48749 | 70.2 |
| 38 | −51.520 | 1.50 | | |
| 39 | −32.291 | 2.30 | 1.63555 | 22.7 |
| 40 | −24.071 | 1.00 | 1.83400 | 37.2 |
| 41 | −131.897 | 0.65 | | |
| 42 | −26963.355 | 6.50 | 1.51633 | 64.1 |
| 43 | −27.684 | 4.50 | | |
| 44 | ∞ | 30.00 | 1.60342 | 38.0 |
| 45 | ∞ | 16.20 | 1.51633 | 64.2 |
| 46 | ∞ | (variable) | | | aspherical surface data
twelfth surface

K = 8.58860e+000   A4 = 8.72570e−006   A6 = −1.90211e−008
A8 = 9.49066e−011   A10 = −9.79700e−013   A12 = 7.34817e−015
A3 = −9.99333e−007   A5 = −5.91697e−008   A7 = −4.82122e−010
A9 = 2.01841e−011   A11 = −1.38838e−013 various data

-continued

| zoom ratio 21.00 | | | |
|---|---|---|---|
| | wide angle | intermediate | telephoto |
| focal length | 7.81 | 31.69 | 163.92 |
| f-number | 1.92 | 1.92 | 2.69 |
| field angle | 35.17 | 9.85 | 1.92 |
| image height | 5.50 | 5.50 | 5.50 |
| entire length of lenses | 269.31 | 269.31 | 269.31 |
| BF | 41.31 | 41.31 | 41.31 |
| d11 | 0.67 | 36.75 | 53.43 |
| d20 | 55.71 | 14.03 | 6.07 |
| d23 | 4.85 | 10.45 | 1.73 |
| d46 | 7.47 | 7.47 | 7.47 |

| zoom lens unit data | | | | | |
|---|---|---|---|---|---|
| unit | start surface | focal length | lens length | front principal point position | rear principal point position |
| 1 | 1 | 68.20 | 56.61 | 36.63 | 2.84 |
| 2 | 12 | -13.40 | 21.23 | 2.17 | -11.59 |
| 3 | 21 | -42.80 | 3.50 | -0.09 | -2.01 |
| 4 | 24 | 62.20 | 136.13 | 71.92 | -140.90 |

Numerical Embodiment 3

| surface data | | | | |
|---|---|---|---|---|
| surface number | r | d | nd | νd |
| 1 | 600.261 | 2.20 | 1.75520 | 27.5 |
| 2 | 81.461 | 11.42 | 1.49700 | 81.6 |
| 3 | -290.956 | 7.63 | | |
| 4 | 86.701 | 7.86 | 1.62041 | 60.3 |
| 5 | 3044.710 | 0.15 | | |
| 6 | 66.016 | 6.01 | 1.72916 | 54.7 |
| 7 | 145.708 | (variable) | | |
| 8 | 111.445 | 0.80 | 1.88300 | 40.8 |
| 9 | 16.812 | 4.65 | | |
| 10 | -47.842 | 0.70 | 1.81600 | 46.6 |
| 11 | 33.779 | 2.24 | | |
| 12 | 28.944 | 5.20 | 1.80518 | 25.4 |
| 13 | -29.192 | 0.54 | | |
| 14 | -24.664 | 0.70 | 1.78800 | 47.4 |
| 15 | 132.572 | (variable) | | |
| 16 | -28.806 | 0.75 | 1.74320 | 49.3 |
| 17 | 37.218 | 3.81 | 1.84666 | 23.9 |
| 18 | 449.023 | (variable) | | |
| 19 | ∞ | 1.80 | | |
| 20 | -1521.790 | 3.79 | 1.72342 | 38.0 |
| 21 | -56.635 | 0.20 | | |
| 22 | 62.045 | 4.71 | 1.51112 | 60.5 |
| 23 | -62.896 | 0.20 | | |
| 24 | 51.363 | 7.33 | 1.48749 | 70.2 |
| 25 | -37.536 | 0.60 | | |
| 26 | -34.877 | 1.66 | 1.83400 | 37.2 |
| 27 | 171.367 | 31.00 | | |
| 28 | 53.779 | 6.08 | 1.50137 | 56.4 |
| 29 | -60.639 | 0.20 | | |
| 30 | -294.279 | 1.40 | 1.83400 | 37.2 |
| 31 | 23.590 | 7.58 | 1.50137 | 56.4 |
| 32 | -115.543 | 0.20 | | |
| 33 | 53.827 | 7.13 | 1.51633 | 64.2 |
| 34 | -32.845 | 1.50 | | |
| 35 | -31.530 | 2.10 | 1.63555 | 22.7 |
| 36 | -27.540 | 1.40 | 1.80400 | 46.6 |
| 37 | 208.408 | 0.30 | | |
| 38 | 48.872 | 5.58 | 1.50137 | 56.4 |
| 39 | -46.227 | 5.00 | | |
| 40 | ∞ | 30.00 | 1.60342 | 38.0 |
| 41 | ∞ | 16.20 | 1.51633 | 64.2 |
| 42 | ∞ | (variable) | | |

-continued

| various data zoom ratio 19.50 | | | |
|---|---|---|---|
| | wide angle | intermediate | telephoto |
| focal length | 9.50 | 38.85 | 185.25 |
| f-number | 1.85 | 1.80 | 2.85 |
| field angle | 30.07 | 8.06 | 1.70 |
| image height | 5.50 | 5.50 | 5.50 |
| entire length of lenses | 244.06 | 244.06 | 244.06 |
| BF | 45.14 | 45.14 | 45.14 |
| d7 | 0.65 | 35.96 | 52.03 |
| d15 | 53.75 | 13.38 | 6.32 |
| d18 | 5.10 | 10.15 | 1.15 |
| d42 | 10.80 | 10.80 | 10.80 |

| zoom lens unit data | | | | | |
|---|---|---|---|---|---|
| unit | start surface | focal length | lens length | front principal point position | rear principal point position |
| 1 | 1 | 76.20 | 35.27 | 18.29 | -6.23 |
| 2 | 8 | -14.00 | 14.84 | 2.02 | -8.81 |
| 3 | 16 | -40.00 | 4.56 | 0.14 | -2.33 |
| 4 | 19 | 59.00 | 135.96 | 66.17 | -132.48 |

Numerical Embodiment 4

| surface data | | | | |
|---|---|---|---|---|
| surface number | r | d | nd | νd |
| 1 | 600.261 | 2.20 | 1.75520 | 27.5 |
| 2 | 81.461 | 11.42 | 1.49700 | 81.6 |
| 3 | -290.956 | 7.63 | | |
| 4 | 86.701 | 7.86 | 1.62041 | 60.3 |
| 5 | 3044.710 | 0.15 | | |
| 6 | 66.016 | 6.01 | 1.72916 | 54.7 |
| 7 | 145.708 | (variable) | | |
| 8 | 111.445 | 0.80 | 1.88300 | 40.8 |
| 9 | 16.812 | 4.65 | | |
| 10 | -47.842 | 0.70 | 1.81600 | 46.6 |
| 11 | 33.779 | 2.24 | | |
| 12 | 28.944 | 5.20 | 1.80518 | 25.4 |
| 13 | -29.192 | 0.54 | | |
| 14 | -24.664 | 0.70 | 1.78800 | 47.4 |
| 15 | 132.572 | (variable) | | |
| 16 | -28.806 | 0.75 | 1.74320 | 49.3 |
| 17 | 37.218 | 3.81 | 1.84666 | 23.9 |
| 18 | 449.023 | (variable) | | |
| 19 | ∞ | 1.80 | | |
| 20 | -152.008 | 2.79 | 1.72342 | 38.0 |
| 21 | -55.371 | 0.20 | | |
| 22 | 145.534 | 5.21 | 1.51112 | 60.5 |
| 23 | -45.580 | 0.20 | | |
| 24 | 36.268 | 7.83 | 1.48749 | 70.2 |
| 25 | -38.673 | 0.60 | | |
| 26 | -37.081 | 1.66 | 1.80100 | 35.0 |
| 27 | 190.720 | 31.00 | | |
| 28 | 43.294 | 7.08 | 1.50137 | 56.4 |
| 29 | -51.666 | 0.20 | | |
| 30 | -92.250 | 1.40 | 1.83400 | 37.2 |
| 31 | 23.280 | 1.80 | 1.69591 | 17.7 |
| 32 | 26.169 | 7.58 | 1.50137 | 56.4 |
| 33 | -82.473 | 0.20 | | |
| 34 | 60.336 | 6.63 | 1.51633 | 64.2 |
| 35 | -37.605 | 1.40 | 1.80400 | 46.6 |
| 36 | 7532.698 | 0.30 | | |
| 37 | 51.262 | 5.08 | 1.50137 | 56.4 |
| 38 | -98.545 | 5.00 | | |
| 39 | ∞ | 30.00 | 1.60342 | 38.0 |
| 40 | ∞ | 16.20 | 1.51633 | 64.2 |
| 41 | ∞ | (variable) | | |

-continued various data
zoom ratio 19.50

| | | | | | |
|---|---|---|---|---|---|
| focal length | 9.50 | 38.86 | 185.25 | 91.49 | 185.25 |
| f-number | 1.85 | 1.80 | 2.85 | 1.80 | 2.85 |
| field angle | 30.07 | 8.06 | 1.70 | 3.44 | 1.70 |
| image height | 5.50 | 5.50 | 5.50 | 5.50 | 5.50 |
| entire length of lenses | 242.26 | 242.26 | 242.26 | 242.26 | 242.26 |
| BF | 45.14 | 45.14 | 45.14 | 45.14 | 45.14 |
| d7 | 0.65 | 35.96 | 52.03 | 46.91 | 52.03 |
| d15 | 53.75 | 13.38 | 6.32 | 3.88 | 6.32 |
| d18 | 5.10 | 10.15 | 1.15 | 8.71 | 1.15 |
| d41 | 10.80 | 10.80 | 10.80 | 10.80 | 10.80 | zoom lens unit data

| unit | start surface | focal length | lens length | front principal point position | rear principal point position |
|---|---|---|---|---|---|
| 1 | 7 | 76.20 | 35.27 | 18.29 | −6.23 |
| 2 | 15 | −14.00 | 14.84 | 2.02 | −8.81 |
| 3 | 18 | −40.00 | 4.56 | 0.14 | −2.33 |
| 4 | 41 | 55.62 | 134.16 | 60.42 | −124.28 |

Numerical Embodiment 5 surface data (equi-magnification)

| surface number | r | d | nd | vd |
|---|---|---|---|---|
| 1 | −200.343 | 1.80 | 1.72916 | 54.7 |
| 2 | 204.613 | 5.58 | | |
| 3 | 413.815 | 1.80 | 1.80518 | 25.4 |
| 4 | 101.511 | 14.94 | 1.43875 | 95.0 |
| 5 | −157.163 | 0.15 | | |
| 6 | 176.271 | 8.28 | 1.59240 | 68.3 |
| 7 | −344.706 | 6.77 | | |
| 8 | 105.690 | 10.62 | 1.49700 | 81.5 |
| 9 | −290.842 | 0.15 | | |
| 10 | 67.523 | 6.52 | 1.72916 | 54.7 |
| 11 | 159.426 | (variable) | | |
| 12* | 135.799 | 0.70 | 1.88300 | 40.8 |
| 13 | 14.159 | 6.06 | | |
| 14 | −131.436 | 6.68 | 1.80809 | 22.8 |
| 15 | −13.727 | 0.70 | 1.81600 | 46.6 |
| 16 | 48.936 | 0.16 | | |
| 17 | 23.757 | 5.95 | 1.53172 | 48.8 |
| 18 | −28.902 | 0.26 | | |
| 19 | −26.005 | 0.70 | 1.83481 | 42.7 |
| 20 | −258.788 | (variable) | | |
| 21 | −28.262 | 0.70 | 1.74320 | 49.3 |
| 22 | 46.007 | 2.80 | 1.84666 | 23.8 |
| 23 | −1313.700 | (variable) | | |
| 24 (stop) | ∞ | 1.30 | | |
| 25 | −168.815 | 4.36 | 1.65844 | 50.9 |
| 26 | −30.878 | 0.15 | | |
| 27 | 101.203 | 3.24 | 1.51633 | 64.1 |
| 28 | −121.294 | 0.15 | | |
| 29 | 70.938 | 6.27 | 1.51633 | 64.1 |
| 30 | −37.101 | 1.50 | 1.83400 | 37.2 |
| 31 | −1396.881 | 35.20 | | |
| 32 | 120.820 | 6.56 | 1.51633 | 64.1 |
| 33 | −83.194 | 0.23 | | |
| 34 | 390.576 | 1.00 | 1.83400 | 37.2 |
| 35 | 25.355 | 7.55 | 1.51742 | 52.4 |
| 36 | −96.499 | 0.40 | | |
| 37 | 54.181 | 9.07 | 1.48749 | 70.2 |
| 38 | −27.626 | 1.00 | 1.83400 | 37.2 |
| 39 | 5005.986 | 0.15 | | |
| 40 | 637.710 | 2.10 | 1.63555 | 22.7 |
| 41 | −138.984 | 5.00 | 1.51823 | 58.9 |
| 42 | −31.247 | 4.50 | | |
| 43 | ∞ | 30.00 | 1.60342 | 38.0 |
| 44 | ∞ | 16.20 | 1.51633 | 64.2 |
| 45 | ∞ | (variable) | | | aspherical surface data
twelfth surface

K = 8.58860e+000   A4 = 8.72570e−006   A6 = −1.90211e−008
A8 = 9.49066e−011   A10 = −9.79700e−013   A12 = 7.34817e−015
A3 = −9.99333e−007   A5 = −5.91697e−008   A7 = −4.82122e−010
A9 = 2.01841e−011   A11 = −1.38838e−013 various data
zoom ratio 21.00

| | wide angle | intermediate | telephoto |
|---|---|---|---|
| focal length | 7.80 | 31.67 | 163.80 |
| f-number | 1.80 | 1.80 | 2.69 |
| field angle | 35.19 | 9.85 | 1.92 |
| image height | 5.50 | 5.50 | 5.50 |
| entire length of lenses | 269.14 | 269.14 | 269.14 |
| BF | 41.34 | 41.34 | 41.34 |
| d11 | 0.67 | 36.75 | 53.43 |
| d20 | 55.71 | 14.03 | 6.07 |
| d23 | 4.85 | 10.45 | 1.73 |
| d45 | 7.50 | 7.50 | 7.50 |
| entrance pupil | 50.21 | 175.89 | 608.52 |
| exit pupil | 294.16 | 294.16 | 294.16 |
| front principal point position | 58.23 | 211.05 | 865.91 |
| rear principal point position | −0.30 | −24.17 | −156.30 | zoom lens unit data

| unit | start surface | focal length | lens length | front principal point position | rear principal point position |
|---|---|---|---|---|---|
| 1 | 1 | 68.20 | 56.61 | 36.63 | 2.84 |
| 2 | 12 | −13.40 | 21.23 | 2.17 | −11.59 |
| 3 | 21 | −42.80 | 3.50 | −0.09 | −2.01 |
| 4 | 24 | 63.70 | 135.94 | 74.52 | −144.37 | surface data (with magnification-varying optical system inserted)

| surface number | r | d | nd | vd |
|---|---|---|---|---|
| 1 | −200.343 | 1.80 | 1.72916 | 54.7 |
| 2 | 204.613 | 5.58 | | |
| 3 | 413.815 | 1.80 | 1.80518 | 25.4 |
| 4 | 101.511 | 14.94 | 1.43875 | 95.0 |
| 5 | −157.163 | 0.15 | | |
| 6 | 176.271 | 8.28 | 1.59240 | 68.3 |
| 7 | −344.706 | 6.77 | | |
| 8 | 105.690 | 10.62 | 1.49700 | 81.5 |
| 9 | −290.842 | 0.15 | | |
| 10 | 67.523 | 6.52 | 1.72916 | 54.7 |
| 11 | 159.426 | (variable) | | |
| 12* | 135.799 | 0.70 | 1.88300 | 40.8 |
| 13 | 14.159 | 6.06 | | |
| 14 | −131.436 | 6.68 | 1.80809 | 22.8 |
| 15 | −13.727 | 0.70 | 1.81600 | 46.6 |
| 16 | 48.936 | 0.16 | | |
| 17 | 23.757 | 5.95 | 1.53172 | 48.8 |
| 18 | −28.902 | 0.26 | | |
| 19 | −26.005 | 0.70 | 1.83481 | 42.7 |
| 20 | −258.788 | (variable) | | |
| 21 | −28.262 | 0.70 | 1.74320 | 49.3 |
| 22 | 46.007 | 2.80 | 1.84666 | 23.8 |
| 23 | −1313.700 | (variable) | | |
| 24 (stop) | ∞ | 1.30 | | |
| 25 | −168.815 | 4.36 | 1.65844 | 50.9 |
| 26 | −30.878 | 0.15 | | |
| 27 | 101.203 | 3.24 | 1.51633 | 64.1 |
| 28 | −121.294 | 0.15 | | |
| 29 | 70.938 | 6.27 | 1.51633 | 64.1 |
| 30 | −37.101 | 1.50 | 1.83400 | 37.2 |
| 31 | −1396.881 | 1.00 | | |
| 32 | 40.512 | 5.06 | 1.59240 | 68.3 |
| 33 | −152.886 | 0.20 | | |
| 34 | 64.858 | 4.31 | 1.43875 | 95.0 |
| 35 | −281.998 | 0.90 | 1.92286 | 18.9 |
| 36 | 122.375 | 18.00 | | |

-continued

| | | | | |
|---|---|---|---|---|
| 37 | −551.510 | 0.70 | 1.88300 | 40.8 |
| 38 | 17.275 | 2.53 | 1.92286 | 18.9 |
| 39 | 25.709 | 2.50 | | |
| 40 | 120.820 | 6.56 | 1.51633 | 64.1 |
| 41 | −83.194 | 0.23 | | |
| 42 | 390.576 | 1.00 | 1.83400 | 37.2 |
| 43 | 25.355 | 7.55 | 1.51742 | 52.4 |
| 44 | −96.499 | 0.40 | | |
| 45 | 54.181 | 9.07 | 1.48749 | 70.2 |
| 46 | −27.626 | 1.00 | 1.83400 | 37.2 |
| 47 | 5005.986 | 0.15 | | |
| 48 | 637.710 | 2.10 | 1.63555 | 22.7 |
| 49 | −138.984 | 5.00 | 1.51823 | 58.9 |
| 50 | −31.247 | 4.50 | | |
| 51 | ∞ | 30.00 | 1.60342 | 38.0 |
| 52 | ∞ | 16.20 | 1.51633 | 64.2 |
| 53 | ∞ | (variable) | | | aspherical surface data
twelfth surface

K = 8.58860e+000  A4 = 8.72570e−006  A6 = −1.90211e−008
A8 = 9.49066e−011  A10 = −9.79700e−013  A12 = 7.34817e−015
A3 = −9.99333e−007  A5 = −5.91697e−008  A7 = −4.82122e−010
A9 = 2.01841e−011  A11 = −1.38838e−013 various data
zoom ratio 21.00

| | wide angle | intermediate | telephoto |
|---|---|---|---|
| focal length | 15.00 | 60.89 | 314.94 |
| f-number | 3.47 | 3.46 | 5.17 |
| field angle | 20.14 | 5.16 | 1.00 |
| image height | 5.50 | 5.50 | 5.50 |
| entire length of lenses | 269.14 | 269.14 | 269.14 |
| BF | 41.34 | 41.34 | 41.34 |
| d11 | 0.67 | 36.75 | 53.43 |
| d20 | 55.71 | 14.03 | 6.07 |
| d23 | 4.85 | 10.45 | 1.73 |
| d53 | 7.50 | 7.50 | 7.50 |
| entrance pupil | 50.21 | 175.89 | 608.52 |
| exit pupil | −149.52 | −149.52 | −149.52 |
| front principal point position | 63.78 | 213.16 | 291.77 |
| rear principal point position | −7.50 | −53.39 | −307.44 | zoom lens unit data

| unit | start surface | focal length | lens length | front principal point position | rear principal point position |
|---|---|---|---|---|---|
| 1 | 1 | 68.20 | 56.61 | 36.63 | 2.84 |
| 2 | 12 | −13.40 | 21.23 | 2.17 | −11.59 |
| 3 | 21 | −42.80 | 3.50 | −0.09 | −2.01 |
| 4 | 24 | 36.20 | 135.94 | 14.60 | −125.04 |

Numerical Embodiment 6 surface data (equi-magnification)

| surface number | r | d | nd | vd |
|---|---|---|---|---|
| 1 | −200.343 | 1.80 | 1.72916 | 54.7 |
| 2 | 204.613 | 5.58 | | |
| 3 | 413.815 | 1.80 | 1.80518 | 25.4 |
| 4 | 101.511 | 14.94 | 1.43875 | 95.0 |
| 5 | −157.163 | 0.15 | | |
| 6 | 176.271 | 8.28 | 1.59240 | 68.3 |
| 7 | −344.706 | 6.77 | | |
| 8 | 105.690 | 10.62 | 1.49700 | 81.5 |
| 9 | −290.842 | 0.15 | | |
| 10 | 67.523 | 6.52 | 1.72916 | 54.7 |
| 11 | 159.426 | (variable) | | |
| 12* | 135.799 | 0.70 | 1.88300 | 40.8 |
| 13 | 14.159 | 6.06 | | |
| 14 | −131.436 | 6.68 | 1.80809 | 22.8 |
| 15 | −13.727 | 0.70 | 1.81600 | 46.6 |
| 16 | 48.936 | 0.16 | | |
| 17 | 23.757 | 5.95 | 1.53172 | 48.8 |
| 18 | −28.902 | 0.26 | | |
| 19 | −26.005 | 0.70 | 1.83481 | 42.7 |
| 20 | −258.788 | (variable) | | |
| 21 | −28.262 | 0.70 | 1.74320 | 49.3 |
| 22 | 46.007 | 2.80 | 1.84666 | 23.8 |
| 23 | −1313.700 | (variable) | | |
| 24 (stop) | ∞ | 1.30 | | |
| 25 | −168.815 | 4.36 | 1.65844 | 50.9 |
| 26 | −30.878 | 0.15 | | |
| 27 | 101.203 | 3.24 | 1.51633 | 64.1 |
| 28 | −121.294 | 0.15 | | |
| 29 | 70.938 | 6.27 | 1.51633 | 64.1 |
| 30 | −37.101 | 1.50 | 1.83400 | 37.2 |
| 31 | −1396.881 | 35.20 | | |
| 32 | 120.820 | 6.56 | 1.51633 | 64.1 |
| 33 | −83.194 | 0.23 | | |
| 34 | 390.576 | 1.00 | 1.83400 | 37.2 |
| 35 | 25.355 | 7.55 | 1.51742 | 52.4 |
| 36 | −96.499 | 0.40 | | |
| 37 | 54.181 | 9.07 | 1.48749 | 70.2 |
| 38 | −27.626 | 1.00 | 1.83400 | 37.2 |
| 39 | 5005.986 | 0.15 | | |
| 40 | 637.710 | 2.10 | 1.63555 | 22.7 |
| 41 | −138.984 | 5.00 | 1.51823 | 58.9 |
| 42 | −31.247 | 4.50 | | |
| 43 | ∞ | 30.00 | 1.60342 | 38.0 |
| 44 | ∞ | 16.20 | 1.51633 | 64.2 |
| 45 | ∞ | (variable) | | | aspherical surface data
twelfth surface

K = 8.58860e+000  A4 = 8.72570e−006  A6 = −1.90211e−008
A8 = 9.49066e−011  A10 = −9.79700e−013  A12 = 7.34817e−015
A3 = −9.99333e−007  A5 = −5.91697e−008  A7 = −4.82122e−010
A9 = 2.01841e−011  A11 = −1.38838e−013 various data
zoom ratio 21.00

| | | | |
|---|---|---|---|
| focal length | 7.80 | 31.67 | 163.80 |
| f-number | 1.80 | 1.80 | 2.69 |
| field angle | 35.19 | 9.85 | 1.92 |
| image height | 5.50 | 5.50 | 5.50 |
| entire length of lenses | 269.14 | 269.14 | 269.14 |
| BF | 41.34 | 41.34 | 41.34 |
| d11 | 0.67 | 36.75 | 53.43 |
| d20 | 55.71 | 14.03 | 6.07 |
| d23 | 4.85 | 10.45 | 1.73 |
| d45 | 7.50 | 7.50 | 7.50 |
| entrance pupil | 50.21 | 175.89 | 608.52 |
| exit pupil | 294.16 | 294.16 | 294.16 |
| front principal point position | 58.23 | 211.05 | 865.91 |
| rear principal point position | −0.30 | −24.17 | −156.30 | zoom lens unit data

| unit | start surface | focal length | lens length | front principal point position | rear principal point position |
|---|---|---|---|---|---|
| 1 | 1 | 68.20 | 56.61 | 36.63 | 2.84 |
| 2 | 12 | −13.40 | 21.23 | 2.17 | −11.59 |
| 3 | 21 | −42.80 | 3.50 | −0.09 | −2.01 |
| 4 | 24 | 63.70 | 135.94 | 74.52 | −144.37 | surface data (with magnification-varying optical system inserted)

| surface number | r | d | nd | vd |
|---|---|---|---|---|
| 1 | −200.343 | 1.80 | 1.72916 | 54.7 |
| 2 | 204.613 | 5.58 | | |
| 3 | 413.815 | 1.80 | 1.80518 | 25.4 |
| 4 | 101.511 | 14.94 | 1.43875 | 95.0 |
| 5 | −157.163 | 0.15 | | |
| 6 | 176.271 | 8.28 | 1.59240 | 68.3 |

-continued

| | | | | |
|---|---|---|---|---|
| 7 | −344.706 | 6.77 | | |
| 8 | 105.690 | 10.62 | 1.49700 | 81.5 |
| 9 | −290.842 | 0.15 | | |
| 10 | 67.523 | 6.52 | 1.72916 | 54.7 |
| 11 | 159.426 | (variable) | | |
| 12* | 135.799 | 0.70 | 1.88300 | 40.8 |
| 13 | 14.159 | 6.06 | | |
| 14 | −131.436 | 6.68 | 1.80809 | 22.8 |
| 15 | −13.727 | 0.70 | 1.81600 | 46.6 |
| 16 | 48.936 | 0.16 | | |
| 17 | 23.757 | 5.95 | 1.53172 | 48.8 |
| 18 | −28.902 | 0.26 | | |
| 19 | −26.005 | 0.70 | 1.83481 | 42.7 |
| 20 | −258.788 | (variable) | | |
| 21 | −28.262 | 0.70 | 1.74320 | 49.3 |
| 22 | 46.007 | 2.80 | 1.84666 | 23.8 |
| 23 | −1313.700 | (variable) | | |
| 24 (stop) | ∞ | 1.30 | | |
| 25 | −168.815 | 4.36 | 1.65844 | 50.9 |
| 26 | −30.878 | 0.15 | | |
| 27 | 101.203 | 3.24 | 1.51633 | 64.1 |
| 28 | −121.294 | 0.15 | | |
| 29 | 70.938 | 6.27 | 1.51633 | 64.1 |
| 30 | −37.101 | 1.50 | 1.83400 | 37.2 |
| 31 | −1396.881 | 1.00 | | |
| 32 | 39.629 | 5.50 | 1.59240 | 68.3 |
| 33 | −160.155 | 0.20 | | |
| 34 | 69.149 | 3.87 | 1.59240 | 68.3 |
| 35 | −817.927 | 1.50 | 1.69591 | 17.7 |
| 36 | −133.644 | 0.90 | 1.92286 | 18.9 |
| 37 | 98.621 | 16.50 | | |
| 38 | −538.052 | 0.70 | 1.88300 | 40.8 |
| 39 | 17.477 | 2.53 | 1.92286 | 18.9 |
| 40 | 25.232 | 2.50 | | |
| 41 | 120.820 | 6.56 | 1.51633 | 64.1 |
| 42 | −83.194 | 0.23 | | |
| 43 | 390.576 | 1.00 | 1.83400 | 37.2 |
| 44 | 25.355 | 7.55 | 1.51742 | 52.4 |
| 45 | −96.499 | 0.40 | | |
| 46 | 54.181 | 9.07 | 1.48749 | 70.2 |
| 47 | −27.626 | 1.00 | 1.83400 | 37.2 |
| 48 | 5005.986 | 0.15 | | |
| 49 | 637.710 | 2.10 | 1.63555 | 22.7 |
| 50 | −138.984 | 5.00 | 1.51823 | 58.9 |
| 51 | −31.247 | 4.50 | | |
| 52 | ∞ | 30.00 | 1.60342 | 38.0 |
| 53 | ∞ | 16.20 | 1.51633 | 64.2 |
| 54 | ∞ | (variable) | | | aspherical surface data
twelfth surface

| | | |
|---|---|---|
| K = 8.58860e+000 | A4 = 8.72570e−006 | A6 = −1.90211e−008 |
| A8 = 9.49066e−011 | A10 = −9.79700e−013 | A12 = 7.34817e−015 |
| A3 = −9.99333e−007 | A5 = −5.91697e−008 | A7 = −4.82122e−010 |
| A9 = 2.01841e−011 | A11 = −1.38838e−013 | | various data
zoom ratio 21.00

| | wide angle | intermediate | telephoto |
|---|---|---|---|
| focal length | 15.00 | 60.89 | 314.94 |
| f-number | 3.47 | 3.46 | 5.17 |
| field angle | 20.14 | 5.16 | 1.00 |
| image height | 5.50 | 5.50 | 5.50 |
| entire length of lenses | 269.14 | 269.14 | 269.14 |
| BF | 41.34 | 41.34 | 41.34 |
| d11 | 0.67 | 36.75 | 53.43 |
| d20 | 55.71 | 14.03 | 6.07 |
| d23 | 4.85 | 10.45 | 1.73 |
| d54 | 7.50 | 7.50 | 7.50 |
| entrance pupil | 50.21 | 175.89 | 608.52 |
| exit pupil | −145.71 | −145.71 | −145.71 |
| front principal point position | 63.74 | 212.58 | 276.10 |
| rear principal point position | −7.50 | −53.39 | −307.43 | zoom lens unit data

| unit | surface | start focal length | focal lens length | front principal point position | rear principal point position |
|---|---|---|---|---|---|
| 1 | 11 | 68.20 | 56.61 | 36.63 | 2.84 |
| 2 | 20 | −13.40 | 21.23 | 2.17 | −11.59 |
| 3 | 23 | −42.80 | 3.50 | −0.09 | −2.01 |
| 4 | 54 | 35.65 | 135.94 | 13.86 | −123.05 |

Numerical Embodiment 7 surface data

| surface number | r | d | nd | νd |
|---|---|---|---|---|
| 1 | −200.343 | 1.80 | 1.72916 | 54.7 |
| 2 | 204.613 | 5.58 | | |
| 3 | 413.815 | 1.80 | 1.80518 | 25.4 |
| 4 | 101.511 | 14.94 | 1.43875 | 95.0 |
| 5 | −157.163 | 0.15 | | |
| 6 | 176.271 | 8.28 | 1.59240 | 68.3 |
| 7 | −344.706 | 6.77 | | |
| 8 | 105.690 | 10.62 | 1.49700 | 81.5 |
| 9 | −290.842 | 0.15 | | |
| 10 | 67.523 | 6.52 | 1.72916 | 54.7 |
| 11 | 159.426 | (variable) | | |
| 12* | 135.799 | 0.70 | 1.88300 | 40.8 |
| 13 | 14.159 | 6.06 | | |
| 14 | −131.436 | 6.68 | 1.80809 | 22.8 |
| 15 | −13.727 | 0.70 | 1.81600 | 46.6 |
| 16 | 48.936 | 0.16 | | |
| 17 | 23.757 | 5.95 | 1.53172 | 48.8 |
| 18 | −28.902 | 0.26 | | |
| 19 | −26.005 | 0.70 | 1.83481 | 42.7 |
| 20 | −258.788 | (variable) | | |
| 21 | −28.262 | 0.70 | 1.74320 | 49.3 |
| 22 | 46.007 | 2.80 | 1.84666 | 23.8 |
| 23 | −1313.700 | (variable) | | |
| 24 (stop) | ∞ | 1.30 | | |
| 25 | 5030.000 | 4.65 | 1.51742 | 52.4 |
| 26 | −36.784 | 0.15 | | |
| 27 | 116.564 | 3.44 | 1.53172 | 48.8 |
| 28 | −93.263 | 0.15 | | |
| 29 | 55.253 | 7.77 | 1.64769 | 33.8 |
| 30 | −32.435 | 1.00 | 1.80518 | 25.4 |
| 31 | 122.046 | 35.20 | | |
| 32 | 97.078 | 5.16 | 1.53172 | 48.8 |
| 33 | −49.782 | 1.03 | | |
| 34 | −4040.188 | 1.00 | 1.88300 | 40.8 |
| 35 | 26.349 | 6.34 | 1.49700 | 81.5 |
| 36 | −151.817 | 0.20 | | |
| 37 | 33.929 | 6.57 | 1.51742 | 52.4 |
| 38 | −47.000 | 1.00 | 1.63555 | 22.7 |
| 39 | −35.000 | 1.00 | 1.83400 | 37.2 |
| 40 | 105.356 | 0.65 | | |
| 41 | 37.333 | 4.30 | 1.48749 | 70.2 |
| 42 | −159.371 | 4.50 | | |
| 43 | ∞ | 30.00 | 1.60342 | 38.0 |
| 44 | ∞ | 16.20 | 1.51633 | 64.2 |
| 45 | ∞ | (variable) | | | aspherical surface data
twelfth surface

| | | |
|---|---|---|
| K = 8.58860e+000 | A4 = 8.72570e−006 | A6 = −1.90211e−008 |
| A8 = 9.49066e−011 | A10 = −9.79700e−013 | A12 = 7.34817e−015 |
| A3 = −9.99333e−007 | A5 = −5.91697e−008 | A7 = −4.82122e−010 |
| A9 = 2.01841e−011 | A11 = −1.38838e−013 | | various data
zoom ratio 21.00

| | | | | | |
|---|---|---|---|---|---|
| focal length | 7.80 | 15.60 | 31.67 | 113.88 | 163.80 |
| f-number | 1.80 | 1.80 | 1.80 | 1.87 | 2.69 |
| field angle | 35.19 | 19.42 | 9.85 | 2.77 | 1.92 |
| image height | 5.50 | 5.50 | 5.50 | 5.50 | 5.50 |

-continued

| | | | | | |
|---|---|---|---|---|---|
| entire length of lenses | 264.81 | 264.81 | 264.81 | 264.81 | 264.81 |
| BF | 41.34 | 41.34 | 41.34 | 41.34 | 41.34 |
| d11 | 0.67 | 22.16 | 36.75 | 51.32 | 53.43 |
| d20 | 55.71 | 31.10 | 14.03 | 3.52 | 6.07 |
| d23 | 4.85 | 7.97 | 10.45 | 6.39 | 1.73 |
| d45 | 7.50 | 7.50 | 7.50 | 7.50 | 7.50 |
| entrance pupil | 50.21 | 97.22 | 175.89 | 472.73 | 608.52 |
| exit pupil | 936.50 | 936.50 | 936.50 | 936.50 | 936.50 |
| front principal point position | 58.08 | 113.08 | 208.63 | 600.57 | 801.21 |
| rear principal point position | −0.30 | −8.10 | −24.17 | −106.38 | −156.30 | zoom lens unit data

| unit | start surface | focal length | lens length | front principal point position | rear principal point position |
|---|---|---|---|---|---|
| 1 | 1 | 68.20 | 56.61 | 36.63 | 2.84 |
| 2 | 12 | −13.40 | 21.23 | 2.17 | −11.59 |
| 3 | 21 | −42.80 | 3.50 | −0.09 | −2.01 |
| 4 | 24 | 52.53 | 131.61 | 55.28 | −117.74 |

TABLE 1

| | Optical material (1) | Optical material (2) |
|---|---|---|
| d-line refractive index | 1.63555 | 1.69591 |
| g-line refractive index | 1.67532 | 1.75164 |
| C-line refractive index | 1.62807 | 1.68528 |
| F-line refractive index | 1.65604 | 1.72465 |
| νd | 22.7 | 17.7 |
| θgd | 1.422 | 1.416 |
| θgF | 0.689 | 0.686 |

TABLE 2

| Conditional Expression | Embodiment | | | | | | |
|---|---|---|---|---|---|---|---|
| | 1 | 2 | 3 | 4 | 5 | 6 | 7 |
| (1) | 0.6453 | 0.6453 | 0.6453 | 0.6559 | 0.6453 | 0.6453 | 0.6453 |
| (2) | 0.6895 | 0.6895 | 0.6895 | 0.6856 | 0.6895 | 0.6895 | 0.6895 |
| (3) | 1.12 | 1.56 | 2.04 | 1.24 | 2.55 | 1.68 | 1.25 |
| (4) | 4.14 | 4.25 | 1.32 | 1.51 | 2.52 | 2.52 | 11.99 |
| (5) | 3.36 | 2.36 | 5.57 | 4.56 | 3.36 | 3.36 | 3.93 |
| (5e) | — | — | — | — | — | 3.55 | — |
| (6) | 2.79 | 2.13 | 4.76 | 4.28 | 2.79 | 2.79 | 3.94 |
| (6e) | — | — | — | — | 4.92 | 4.92 | — |
| (7) | — | — | — | — | 2.08 | 2.08 | — |
| (8) | 0.196 | 0.184 | 0.212 | 0.173 | 0.226 | 0.226 | 0.180 |
| (10) D | 35.2 | 35.2 | 31 | 31 | 35.2 | 35.2 | 35.2 |
| L4/8 | 10.65 | 10.65 | 10.60 | 10.37 | 10.65 | 10.65 | 10.11 |
| (11) | 0.78 | 2.94 | −2.52 | −0.89 | 0.78 | 0.78 | 0.00 |
| (12) | 1.365 | 1.365 | 1.365 | 1.377 | 1.365 | 1.365 | 1.365 |
| (13) | 1.422 | 1.422 | 1.422 | 1.416 | 1.422 | 1.422 | 1.422 |

As is apparent from the above description, the zoom lens system according to each of the embodiments has high optical performance because the chromatic aberrations are excellently reduced over the entire zoom range. Therefore, the image pickup apparatus (camera) including the zoom lens system according to each of the embodiments also has high optical performance (is capable of obtaining high-quality image).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-008715, filed Jan. 19, 2009, which is hereby incorporated by reference herein in its entirety.

What is claimed is:

1. A zoom lens system comprising, in order from an object side to an image side:

a first lens unit which does not move for zooming and has a positive refractive power;

a second lens unit which moves to the image side during zooming from a wide angle end to a telephoto end and has a negative refractive power;

a third lens unit which moves on an optical axis during zooming; and a fourth lens unit which does not move during zooming and has a positive refractive power, wherein the fourth lens unit is constituted by a front lens subunit having a positive refractive power and a rear lens subunit having a positive refractive power with an air interval therebetween, which air interval being the largest within the fourth lens unit, wherein the front lens subunit and the rear lens subunit each have at least one positive lens and at least one negative lens, wherein the fourth lens unit satisfies the following conditions:

$$0.8 < (\nu fp/\nu fn)/(\nu rp/\nu rn) < 4.0; \text{ and}$$

$$0.8 < |\{(\theta fn - \theta fp)/(\nu fp - \nu fn)\}/\{(\theta rn - \theta rp)/(\nu rp - \nu rn)\}|,$$

where $\nu fp$ and $\theta fp$ indicate an average value of Abbe number and an average value of partial dispersion ratios $\theta gF$ of materials of positive lenses included in the front lens subunit, respectively, $\nu fn$ and $\theta fn$ indicate an average value of Abbe number and an average value of partial dispersion ratios $\theta gF$ of materials of the negative lenses included in the front lens subunit, respectively, $\nu rp$ and $\theta rp$ indicate an average value of Abbe number and an average value of partial dispersion ratios $\theta gF$ of materials of the positive lenses included in the rear lens subunit, respectively, vrn and θrn indicate an average value of Abbe number and an average value of partial dispersion ratios θgF of materials of the negative lenses included in the rear lens subunit, respectively, wherein the following condition is satisfied:

$1.8 < fGNL/f42 < 6.5$, where fGNL represents a focal length of the lens GNL and f42 represents a focal length of the rear lens subunit, wherein the rear lens subunit includes a lens GNL formed of a material having a characteristic satisfying:

$-2.100 \times 10^{-3} \times vd + 0.693 < \theta gF$; and $0.555 < \theta gF < 0.900$, where vd indicates an Abbe number of the material and θgF indicates a partial dispersion ratio, with respect to a g-line and an F-line, of the material, and wherein the Abbe number vd and the partial dispersion ratio θgF with respect to the g-line and the F-line satisfying:

$vd = (Nd-1)/(NF-NC)$; and $\theta gF = (Ng-NF)/(NF-NC)$, where Ng, NF, Nd, and NC denote refractive indexes with respect to the g-line at 435.8 nm, the F-line 486.1 nm, a d-line 587.8 nm and a C-line 656.3 nm of the material, respectively.

2. A zoom lens system according to claim 1, wherein the following condition is satisfied:

$1.5 < fGNL/f4 < 5.5$, where fGNL represents a focal length of the lens GNL and f4 represents a focal length of the fourth lens unit.

3. A zoom lens system according to claim 1, wherein the material of the lens GNL has a partial dispersion ratio θgd, with respect to a g-line and a d-line, which satisfies the following conditions:

$-2.407 \times 10^{-3} \times vd + 1.420 < \theta gd$; and $1.255 < \theta gd < 1.670$.

4. A zoom lens system according to claim 1, wherein the front lens subunit comprises a positive lens having a convex surface on the image side, a first biconvex positive lens, and a second biconvex positive lens.

5. A zoom lens system according to claim 1, wherein the rear lens subunit comprises one of:
a lens unit which includes a positive lens, a cemented lens having a negative lens and a positive lens cemented together, a cemented lens having a positive lens and a negative lens cemented together, and a cemented lens having two positive lens cemented together;
a lens unit which includes a positive lens, a cemented lens having a negative lens and a positive lens cemented together, a positive lens, a cemented lens having a positive lens and a negative lens cemented together, and a positive lens;
a lens unit which includes a positive lens, a cemented lens having a negative lens, a positive lens, and a positive lens cemented together, a cemented lens having a positive lens and a negative lens cemented together, and a positive lens; or
a lens unit which includes a positive lens, a cemented lens having a negative lens and a positive lens cemented together, a cemented lens having a positive lens, a positive lens, and a negative lens cemented together, and a positive lens.

6. A zoom lens system according to claim 1, wherein the zoom lens system forms an image on a photoelectric transducer.

7. An image pickup apparatus comprising:
an image pickup element for receiving an image of a subject; and
a zoom lens system for forming the image of the subject on the image pickup element,
wherein the zoom lens system includes, in order from a subject side to an image side:
a first lens unit which does not move for zooming and has a positive refractive power;
a second lens unit which moves to the image side during zooming from a wide angle end to a telephoto end and has a negative refractive power;
a third lens unit which moves on an optical axis in conjunction with the movement of the second lens unit and has a negative refractive power; and
a fourth lens unit which does not move during zooming and has a positive refractive power,
wherein the fourth lens unit is constituted by a front lens subunit having a positive refractive power and a rear lens subunit having a positive refractive power with an air interval therebetween, which air interval being the largest within the fourth lens unit,
wherein the front lens subunit and the rear lens subunit each have at least one positive lens and at least one negative lens,
wherein the fourth lens unit satisfies the following conditions:

$0.8 < (vfp/vfn)/(vrp/vrn) < 4.0$; and $0.8 < |\{(\theta fn - \theta fp)/(vfp - vfn)\}/\{(\theta rn - \theta rp)/(vrp - vrn)\}|$, where vfp and θfp indicate an average value of Abbe number and an average value of partial dispersion ratios θgF of materials of the positive lenses included in the front lens subunit, respectively, vfn and θfn indicate an average value of Abbe number and an average value of partial dispersion ratios θgF of materials of the negative lenses included in the front lens subunit, respectively, vrp and θrp indicate an average value of Abbe number and an average value of partial dispersion ratios θgF of materials of the positive lenses included in the rear lens subunit, respectively, vrn and θrn indicate an average value of Abbe number and an average value of partial dispersion ratios θgF of materials of the negative lenses included in the rear lens subunit, respectively, wherein the following condition is satisfied:

$1.8 < fGNL/f42 < 6.5$, where fGNL represents a focal length of the lens GNL and f42 represents a focal length of the rear lens subunit, wherein the rear lens subunit includes a lens GNL formed of a material having a characteristic satisfying:

$-2.100 \times 10^{-3} \times vd + 0.693 < \theta gF$; and $0.555 < \theta gF < 0.900$, where vd indicates an Abbe number of the material and θgF indicates a partial dispersion ratio, with respect to a g-line and an F-line, of the material, and wherein the Abbe number νd and the partial dispersion ratio θgF with respect to the g-line and the F-line satisfying:

$$\nu d=(Nd-1)/(NF-NC); \text{ and}$$

$$\theta gF=(Ng-NF)/(NF-NC),$$

where Ng, NF, Nd, and NC denote refractive indexes with respect to the g-line at 435.8 nm, the F-line at 486.1 nm, a d-line at 587.8 nm and a C-line at 656.3 nm of the material, respectively.

8. An image pickup apparatus comprising:
an image pickup element for receiving an image of a subject; and
a zoom lens system for forming the image of the subject on the image pickup element,
wherein the zoom lens system includes, in order from a subject side to an image side:
a first lens unit which does not move for zooming and has a positive refractive power;
a second lens unit which moves to the image side during zooming from a wide angle end to a telephoto end and has a negative refractive power;
a third lens unit which moves on an optical axis in conjunction with the movement of the second lens unit and has a negative refractive power; and
a fourth lens unit which does not move during zooming and has a positive refractive power,
wherein the fourth lens unit is constituted by a front lens subunit having a positive refractive power and a rear lens subunit having a positive refractive power with an air interval therebetween, which air interval being the largest within the fourth lens unit,
wherein the front lens subunit and the rear lens subunit each have at least one positive lens and at least one negative lens,
wherein the fourth lens unit satisfies the following conditions:

$$0.8<(\nu fp/\nu fn)/(\nu rp/\nu rn)<4.0; \text{ and}$$

$$0.8<|\{(\theta fn-\theta fp)/(\nu fp-\nu fn)\}/\{(\theta rn-\theta rp)/(\nu rp-\nu rn)\}|,$$

where νfp and θfp indicate an average value of Abbe number and an average value of partial dispersion ratios θgF of materials of the positive lenses included in the front lens subunit, respectively, νfn and θfn indicate an average value of Abbe number and an average value of partial dispersion ratios θqF of materials of the negative lenses included in the front lens subunit, respectively, νrp and θrp indicate an average value of Abbe number and an average value of partial dispersion ratios θgF of materials of the positive lenses included in the rear lens subunit, respectively, νrn and θrn indicate an average value of Abbe number and an average value of partial dispersion ratios θgF of materials of the negative lenses included in the rear lens subunit, respectively,
wherein the rear lens subunit includes a lens GNL formed of a material having a characteristic satisfying:

$$-2.100\times10^{-3}\times\nu d+0.693<\theta gF; \text{ and}$$

$$0.555<\theta gF<0.900,$$

where νd indicates an Abbe number of the material and θgF indicates a partial dispersion ratio, with respect to a g-line and an F-line, of the material, and wherein the Abbe number νd and the partial dispersion ratio θgF with respect to the g-line and the F-line satisfying:

$$\nu d=(Nd-1)/(NF-NC); \text{ and}$$

$$\theta gF=(Ng-NF)/(NF-NC),$$

where Ng, NF, Nd, and NC denote refractive indexes with respect to the g-line at 435.8 nm, the F-line at 486.1 nm, a d-line at 587.8 nm and a C-line at 656.3 nm—; of the material, respectively,
wherein the fourth lens unit further comprises a magnification-varying optical system which is removably insertable; onto an optical path between the front lens subunit and the rear lens subunit, and
wherein the following condition is satisfied:

$$0.7<h\_k/h\_k\_1<2.5,$$

where h_k indicates a beam diameter of an on-axial beam incident on a first lens surface of the magnification-varying optical system and h_k_1 indicates a beam diameter of an on-axial beam emerged from a final lens surface of the magnification-varying optical system.

9. An image pickup apparatus according to claim 8, wherein the magnification-varying optical system comprises a lens formed of the material having the characteristic satisfying:

$$-2.100\times10^{-3}\times\nu d+0.693<\theta gF; \text{ and}$$

$$0.555<\theta gF<0.900.$$

10. An image pickup apparatus according to claim 7, wherein the following condition is satisfied:

$$0.05<h\_\text{bar}/h<1.50,$$

where h_bar indicates a height with respect to the optical axis, at which an off-axial beam passes through the lens GNL in paraxial tracing and h indicates a height with respect to the optical axis, at which an on-axial beam passes through the lens GNL in paraxial tracing.

11. An image pickup apparatus according to claim 7, wherein the fourth lens unit satisfies the following conditions:

$$L4/8<D; \text{ and}$$

$$-5°<\theta<+5°,$$

where D indicates the air interval between the front lens subunit and the rear lens subunit in the fourth lens unit, L4 indicates a length between a first lens surface and a final lens surface of the fourth lens unit, θ indicates an oblique angle in degrees with respect to the optical axis, at which an on-axial beam passes through the air interval between the front lens subunit and the rear lens subunit in the fourth lens unit, an angle of a converged light beam with respect to the optical axis is expressed as "+" and an angle of a diverged light beam with respect to the optical axis is expressed as "−", and θ=0 in an afocal state.

12. A zoom lens system comprising, in order from an object side to an image side:
a first lens unit which does not move for zooming and has a positive refractive power;
a second lens unit which moves to the image side during zooming from a wide angle end to a telephoto end and has a negative refractive power;
a third lens unit which moves on an optical axis during zooming; and a fourth lens unit which does not move during zooming and has a positive refractive power, wherein the fourth lens unit is constituted by a front lens subunit having a positive refractive power and a rear lens subunit having a positive refractive power with an air interval therebetween, which air interval being the largest within the fourth lens unit, wherein the front lens subunit and the rear lens subunit each have at least one positive lens and at least one negative lens, wherein the fourth lens unit satisfies the following conditions:

$$0.8 < (\nu fp/\nu fn)/(\nu rp/\nu rn) < 4.0; \text{ and}$$

$$0.8 < |\{(\theta fn - \theta fp)/(\nu fp - \nu fn)\}/\{(\theta rn - \theta rp)/(\nu rp - \nu rn)\}|,$$

where νfp and θfp indicate an average value of Abbe number and an average value of partial dispersion ratios θgF of materials of positive lenses included in the front lens subunit, respectively, νfn and θfn indicate an average value of Abbe number and an average value of partial dispersion ratios θgF of materials of the negative lenses included in the front lens subunit, respectively, νrp and θrp indicate an average value of Abbe number and an average value of partial dispersion ratios θgF of materials of the positive lenses included in the rear lens subunit, respectively, νrn and θrn indicate an average value of Abbe number and an average value of partial dispersion ratios θgF of materials of the negative lenses included in the rear lens subunit, respectively, wherein the rear lens subunit includes a lens GNL formed of a material having a characteristic satisfying:

$$-2.100 \times 10^{-3} \times \nu d + 0.693 < \theta gF; \text{ and}$$

$$0.555 < \theta gF < 0.900,$$

where νd indicates an Abbe number of the material and θgF indicates a partial dispersion ratio, with respect to a g-line and an F-line, of the material, and wherein the Abbe number νd and the partial dispersion ratio θgF with respect to the g-line and the F-line satisfying:

$$\nu d = (Nd - 1)/(NF - NC); \text{ and}$$

$$\theta gF = (Ng - NF)/(NF - NC),$$

where Ng, NF, Nd, and NC denote refractive indexes with respect to the g-line at 435.8 nm, the F-line at 486.1 nm, a d-line at 587.8 nm and a C-line at 656.3 nm of the material, respectively, wherein the fourth lens unit further comprises a magnification-varying optical system which is removably insertable onto an optical path between the front lens subunit and the rear lens subunit, and wherein the following condition is satisfied:

$$0.7 < h\_k/h\_k\_1 < 2.5,$$

where h_k indicates a beam diameter of an on-axial beam incident on a first lens surface of the magnification-varying optical system and h_k_1 indicates a beam diameter of an on-axial beam emerged from a final lens surface of the magnification-varying optical system.

13. A zoom lens system according to claim 12, wherein the magnification-varying optical system comprises a lens formed of the material having the characteristic satisfying:

$$-2.100 \times 10^{-3} \times \nu d + 0.693 < \theta gF; \text{ and}$$

$$0.555 < \theta gF < 0.900.$$

14. An image pickup apparatus according to claim 7, wherein the front lens subunit comprises a positive lens having a convex surface on the image side, a first biconvex positive lens, and a second biconvex positive lens.

15. An image pickup apparatus according to claim 7, wherein the rear lens subunit comprises one of:

a lens unit which includes a positive lens, a cemented lens having a negative lens and a positive lens cemented together, a cemented lens having a positive lens and a negative lens cemented together, and a cemented lens having two positive lens cemented together;

a lens unit which includes a positive lens, a cemented lens having a negative lens and a positive lens cemented together, a positive lens, a cemented lens having a positive lens and a negative lens cemented together, and a positive lens;

a lens unit which includes a positive lens, a cemented lens having a negative lens, a positive lens, and a positive lens cemented together, a cemented lens having a positive lens and a negative lens cemented together, and a positive lens; or a lens unit which includes a positive lens, a cemented lens having a negative lens and a positive lens cemented together, a cemented lens having a positive lens, a positive lens, and a negative lens cemented together, and a positive lens.

* * * * *